US012534958B2

(12) United States Patent
Miyahara et al.

(10) Patent No.: US 12,534,958 B2
(45) Date of Patent: Jan. 27, 2026

(54) SHUTTER

(71) Applicant: Daifuku Co., Ltd., Osaka (JP)

(72) Inventors: Akira Miyahara, Hinocho (JP); Kouichirou Nakashima, Hinocho (JP)

(73) Assignee: Daifuku Co., Ltd., Osaka (JP)

( * ) Notice: Subject to any disclaimer, the term of this patent is extended or adjusted under 35 U.S.C. 154(b) by 402 days.

(21) Appl. No.: 17/962,744

(22) Filed: Oct. 10, 2022

(65) Prior Publication Data

US 2023/0110733 A1 Apr. 13, 2023

(30) Foreign Application Priority Data

Oct. 11, 2021 (JP) ................................ 2021-166953
May 10, 2022 (JP) ................................ 2022-077517

(51) Int. Cl.

*E06B 9/11* (2006.01)
*E06B 9/58* (2006.01)
*E06B 9/80* (2006.01)

(52) U.S. Cl.

CPC .................. *E06B 9/58* (2013.01); *E06B 9/11* (2013.01); *E06B 9/80* (2013.01)

(58) Field of Classification Search

CPC ..... E06B 9/15; E06B 9/17; E06B 9/18; E06B 9/11; E06B 2009/1566; E06B 2009/6836
See application file for complete search history.

(56) References Cited

U.S. PATENT DOCUMENTS 3,601,175 A * 8/1971 Wardlaw ................... E06B 9/18 451/48
3,850,465 A * 11/1974 Hill ........................... E06B 9/18 160/133
6,189,593 B1 * 2/2001 Katchur .................... E06B 9/18 160/133
6,240,997 B1 * 6/2001 Lee ........................... E06B 9/18 160/310
9,803,420 B2 * 10/2017 Ronchetti ............. E06B 9/0638
2004/0016516 A1 * 1/2004 Belanger ................... E06B 9/86 160/133

(Continued)

FOREIGN PATENT DOCUMENTS

CH 348541 A * 6/1957
FR 789021 A * 10/1935

(Continued)

OTHER PUBLICATIONS

FR 789021 machine translation (Year: 1935).*

*Primary Examiner* — Abe Massad
(74) *Attorney, Agent, or Firm* — The Webb Law Firm

(57) ABSTRACT

An opening and closing body includes a plurality of rod-shaped members, and a plurality of coupling members configured to couple the plurality of rod-shaped members. Each of the coupling members includes a pair of fitting parts that are spaced apart in a guide direction and configured to be fitted to a coupling target pair of rod-shaped members that are adjacent to each other in the guide direction. Each of the fitting parts includes a cover part having flexibility and configured to cover a range of an outer circumferential surface of the fitted rod-shaped member, the range being smaller than a circumference of the outer circumferential surface and larger than half the circumference as viewed in a first direction.

14 Claims, 11 Drawing Sheets

(56) References Cited

U.S. PATENT DOCUMENTS

| | | | | |
|---|---|---|---|---|
| 2011/0271602 | A1* | 11/2011 | Bartole | G01S 17/42 49/506 |
| 2012/0292514 | A1* | 11/2012 | Pfiffner | E05F 15/43 250/340 |
| 2018/0002980 | A1* | 1/2018 | Bartole | E05F 15/43 |

FOREIGN PATENT DOCUMENTS

| | | | |
|---|---|---|---|
| FR | 2621068 | A1 * | 9/1987 |
| JP | 44464 | Y2 | 2/1992 |
| JP | 2001115761 | A | 4/2001 |
| JP | 20171832 | A | 1/2017 |

* cited by examiner

SHUTTER

CROSS-REFERENCE TO RELATED APPLICATIONS

This application claims priority to Japanese Patent Application Nos. 2021-166953 filed Oct. 11, 2021 and 2022-077517 filed May 10, 2022, the disclosures of which are hereby incorporated by reference in their entireties.

BACKGROUND OF THE INVENTION

1. Field of the Invention

The present invention relates to a shutter including a pair of guide rails spaced apart in a first direction extending in a horizontal direction, a guide path extending in an extension direction of the pair of guide rails between the pair of guide rails in the first direction, and an opening and closing body configured to move along the guide path.

2. Description of the Related Art

JP 2001-115761A (Patent Document 1) discloses an example of such a shutter. The shutter disclosed in Patent Document 1 is assembled by attaching a sheet-shaped opening and closing body (2) to a gate-shaped frame (1a) in such a manner as to extend along the frame (1a). Note that the reference numerals shown in parentheses in the above description are those of Patent Document 1.

For example, a shutter such as the one disclosed in Patent Document 1 is used at the entrance of a building, or used for separating, from each other, an area in which a worker performs work and an area in which a machine operates in a factory. A shutter used for such an application tends to be large in size. In particular, when a sheet-shaped opening and closing body is used as in the case of the shutter disclosed in Patent Document 1, the size of the opening and closing body tends to be large. As such, in the case of assembling a large shutter by attaching a large opening and closing body to a frame, considerable constraints tend to be imposed on the assembly work, including, for example, a wide space and a large number of workers required for the assembly work.

SUMMARY OF THE INVENTION

In view of the above-described circumstances, it is desirable to realize a shutter that allows an assembly operation to be performed relatively easily even when including a large opening and closing body.

A technique for solving the above-described problem is as follows.

A shutter including:

- a pair of guide rails spaced apart in a first direction extending in a horizontal direction;
- a guide path extending in an extension direction of the pair of guide rails at a position between the pair of guide rails in the first direction; and
- an opening and closing body configured to move along the guide path,
- wherein the opening and closing body includes a plurality of rod-shaped members extending in the first direction and arranged at an interval in a guide direction extending along the guide path, and a plurality of coupling members disposed in the guide direction and configured to couple the plurality of rod-shaped members,
- opposite end portions of each of the plurality of rod-shaped members in the first direction are respectively guided by the pair of guide rails in such a manner as to be movable in the guide direction,
- each of the coupling members includes a pair of fitting parts that are spaced apart in the guide direction and configured to be fitted to a coupling target pair of rod-shaped members that are adjacent to each other in the guide direction, and
- each of the fitting parts includes a cover part having flexibility and configured to cover a range of an outer circumferential surface of the fitted rod-shaped member, the range being smaller than a circumference of the outer circumferential surface and larger than half the circumference as viewed in the first direction.

With this configuration, the opening and closing body includes a plurality of rod-shaped members and a plurality of coupling members. To assemble the shutter, opposite end portions of each of the plurality of rod-shaped members in the first direction X are respectively attached to a pair of guide rails, thereby arranging the plurality of rod-shaped members in the guide direction. Then, a pair of fitting parts of each of the corresponding coupling member are fitted to a coupling target pair of the rod-shaped members that are adjacent to each other in the guide direction, thereby coupling the pair of rod-shaped members that are adjacent to each other in the guide direction. In this manner, with this configuration, the plurality of rod-shaped members can be sequentially attached to the pair of guide rails. Accordingly, an assembly operation can be performed without the need of a wide space, unlike the case where one large opening and closing body is attached to the pair of guide rails. In addition, this assembly operation is performed in separate steps for each member, and therefore the number of workers can be easily reduced. Furthermore, with this configuration, the cover part of each of the fitting parts has flexibility. Accordingly, when the fitting part is pressed against the corresponding rod-shaped member from a direction orthogonal to the first direction in such a manner as to be fitted thereto, it is possible to temporarily enlarge a cut-out part, where the cover part is not formed, of the fitting part, thereby inserting the rod-shaped member inside the cover part. Also, the cover part covers a range of the outer circumferential surface of the rod-shaped member, the range being smaller than a circumference of the outer circumferential surface and larger than half the circumference as viewed in the first direction. Accordingly, after the rod-shaped member has been fitted to the fitting part, the coupling member is unlikely to be detached from the rod-shaped member. Therefore, the plurality of rod-shaped members can be coupled through a simple operation, thereby forming the opening and closing body. As described above, this configuration makes it possible to realize a shutter that allows an assembly operation to be performed relatively easily even when including a large opening and closing body.

Further features and advantages of the technique according to the present disclosure will become apparent from the following description of illustrative and non-limiting embodiments with reference to the drawings.

DESCRIPTION OF THE INVENTION

First Embodiment

Hereinafter, a first embodiment of the shutter will be described, taking as an example, a case where a transport facility includes the shutter.

Figure 1:
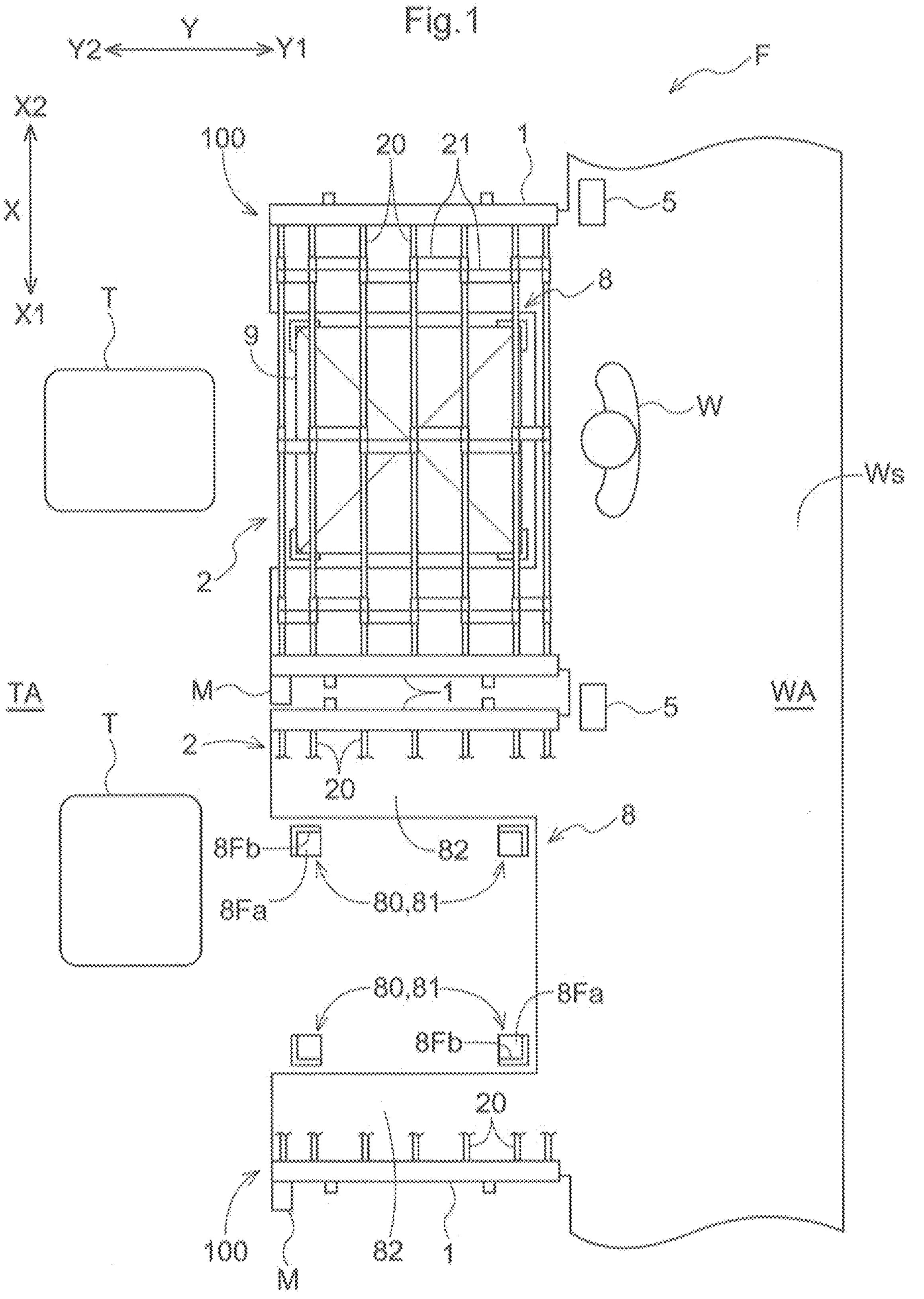
FIG. 1 is a plan view of a transport facility including a shutter.
Figure 2:
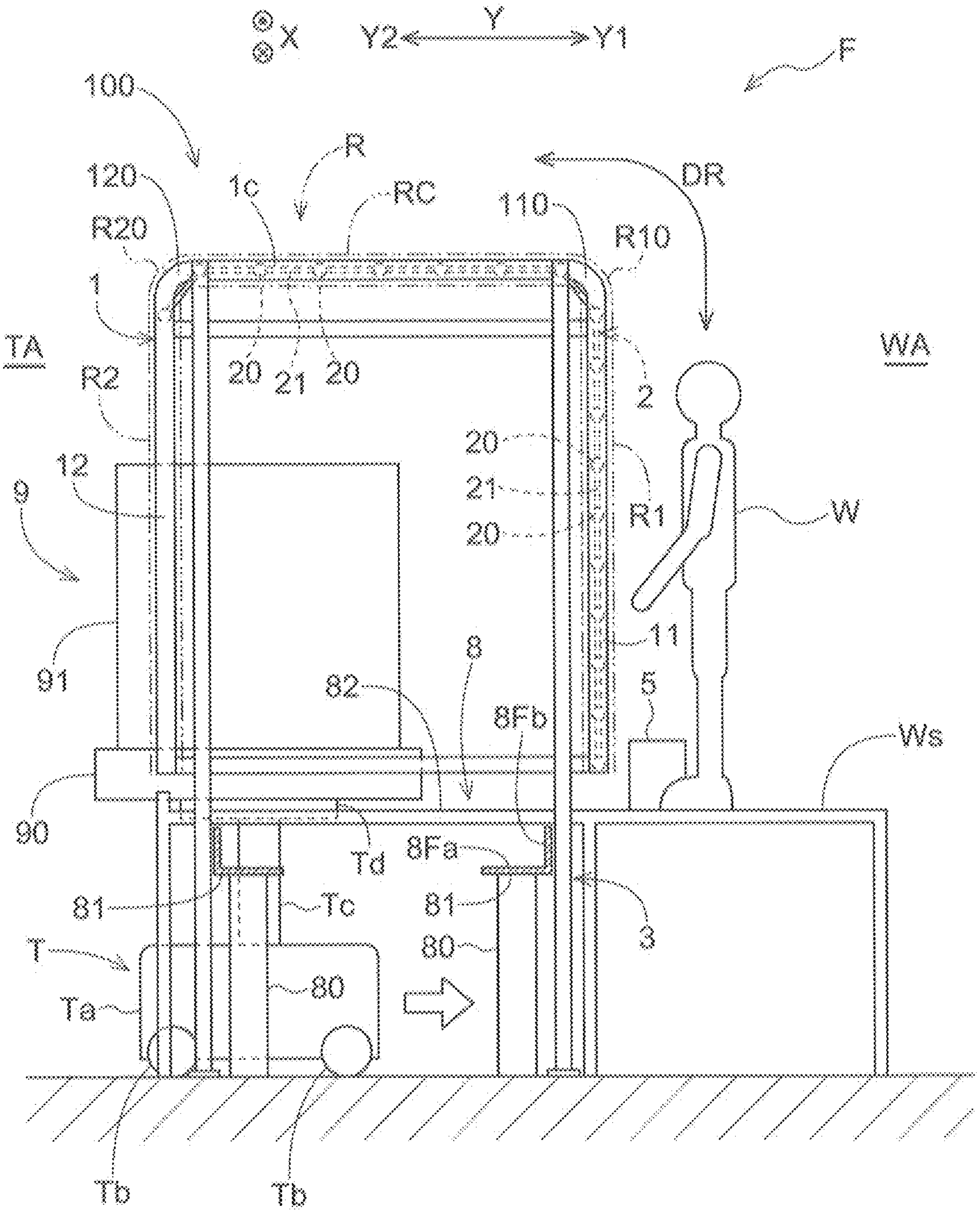
FIG. 2 is a view showing an opening and closing body in a first state as viewed in a first direction.
Figure 3:
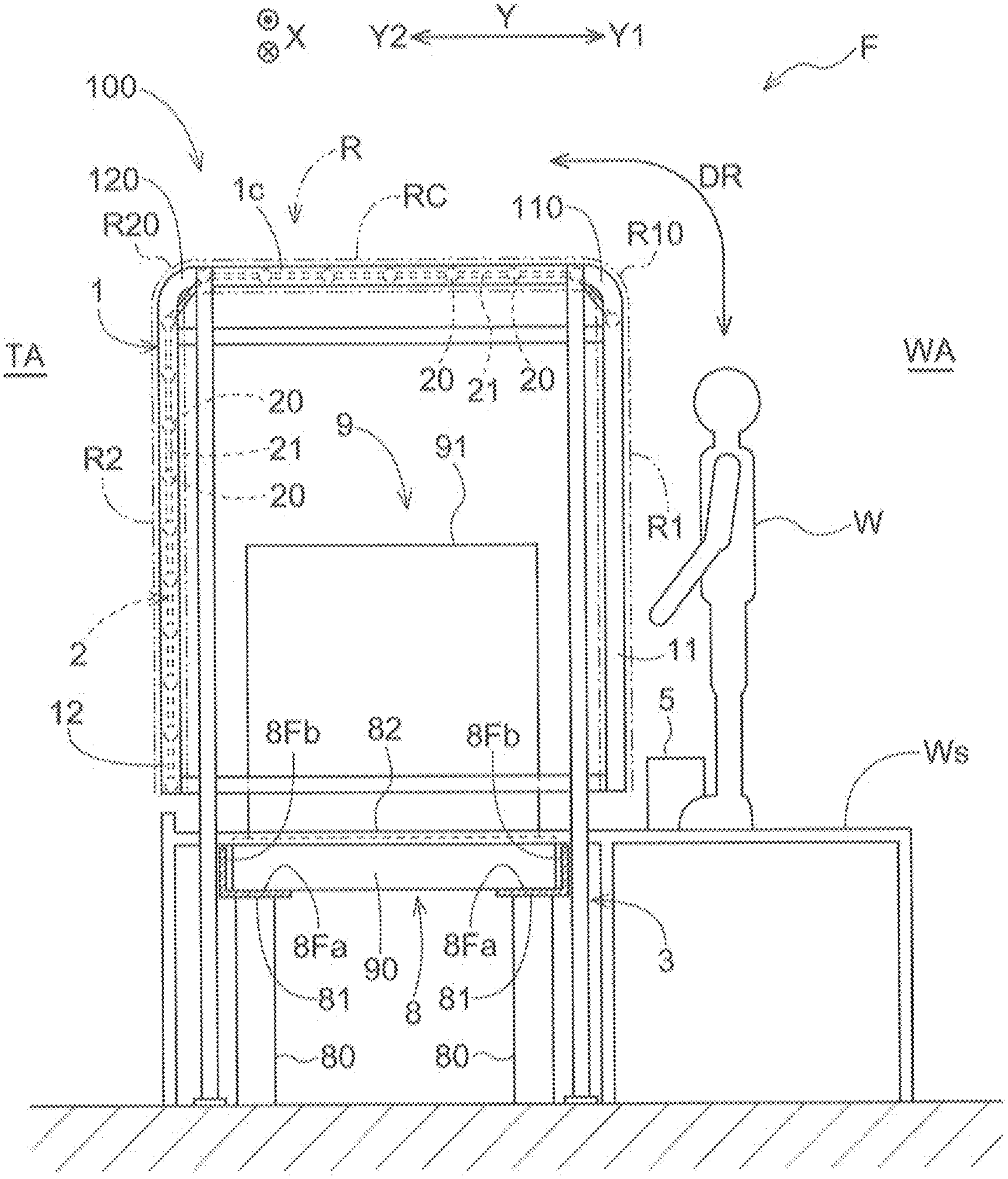
FIG. 3 is a view showing the opening and closing body in a second state as viewed in the first direction.

As shown in FIGS. 1 to 3, a transport facility F is a facility in which an article 9 is transported, and various types of work are performed on the article 9.

The transport facility F includes a shutter 100, at least one article placement portion 8 that is provided in a placement region of the shutter 100 and on which the article 9 is placeable, a work area WA in which work is performed on the article 9 placed on the article placement portion 8, and a transport area TA for transporting the article 9 to the article placement portion 8.

The article placement portion 8 is provided between the work area WA and the transport area TA as viewed in a vertical direction. In the present embodiment, the article placement portion 8 includes a plurality of struts 80 disposed in the vertical direction, and an article receiving portion 81 provided on an upper portion of each of the struts 80. In the illustrated example, four struts 80 are disposed at intervals from each other. In the present example, the article receiving portion 81 provided on each of the struts 80 includes a receiving surface 8Fa that receives the article 9 from below, and a guide surface 8Fb standing upright from the receiving surface 8Fa. The guide surface 8Fb guides, to the receiving surface 8Fa, the article 9 approaching the receiving surface 8Fa from above through a transfer operation, which will be described below, performed by the transport device T. The guide surface 8Fb faces a side surface of an article 9 while the article 9 is placed on the receiving surface 8Fa. As such, the guide surface 8Fb also has the function of horizontally positioning the article 9 placed on the article placement portion 8.

In the present embodiment, the shutter 100 is provided in such a manner as to cover the article placement portion 8, and configured to separate the work area WA and the transport area TA from each other. More specifically, the shutter 100 is configured to separate an area in which the article placement portion 8 is provided and the work area WA from each other, and to separate the area in which the article placement portion 8 is provided and the transport area TA from each other. Accordingly, the shutter 100 is capable of separating the work area WA and the transport area TA from each other.

In the work area WA, a worker W or a work robot performs various types of work. In the present embodiment, in the work area WA, the worker W performs work on the article 9 placed on the article placement portion 8. In the present embodiment, a work platform Ws is provided in the work area WA. The worker W can perform work while standing on the work platform Ws. The work platform Ws is configured to support the worker W at a position spaced upward from a floor.

In the transport area TA, an operation of transporting the article 9 is performed. In the present embodiment, a transport device T that transports the article 9 is provided in the transport area TA. The transport device T is configured to transport the article 9 to the article placement portion 8.

The transport device T is configured as a trackless or tracked automated guided vehicle. In the present embodiment, the transport device T is configured to travel on a floor. In the example shown in FIG. 2, the transport device T is configured to travel on a floor disposed at a position below the upper surface of the work platform Ws to transport the article 9.

In the present embodiment, each article 9 includes a container 91 that houses a target object, and a pallet 90 on which the container 91 is placed (see FIGS. 2 and 3). The transport device T may transport a pallet 90 with a container 91 placed thereon. In addition, the transport device T may transport only a pallet 90 without any container 91 placed thereon. Here, examples of the target object housed in the container 91 include a finished product and a workpiece. The container 91 may be, for example, a cardboard box, a container box, or the like. Note that a plurality of containers 91 may be placed on the pallet 90 while being stacked.

As shown in FIG. 2, in the present embodiment, the transport device T includes a carriage body Ta, a plurality of travel wheels Tb attached to the carriage body Ta, and a transferrer Tc that transfers the article 9 to and from the article placement portion 8.

In the present embodiment, the transferrer Tc transfers the article 9 to and from the article placement portion 8 by raising and lowering, between an upper position and a lower position, a placement table Td on which the article 9 can be placed. While the placement table Td is disposed at the upper position, the upper surface of the placement table Td is disposed above the receiving surfaces 8Fa of the article receiving portions 81. While the placement table Td is disposed at the lower position, the upper surface of the placement table Td is disposed below the receiving surfaces 8Fa of the article receiving portions 81. The transferrer Tc receives an article 9 from the article receiving portions 81 by raising the placement table Td to the upper position from the lower position while the article 9 is placed on the article receiving portions 81 of the article placement portion 8. The transferrer Tc delivers an article 9 to the article receiving portions 81 by lowering the placement table Td to the lower position from the upper position while the article 9 is placed on the placement table Td.

As shown in FIGS. 1 to 3, the shutter 100 includes a pair of guide rails 1 spaced apart in a first direction X extending in the horizontal direction, a guide path R extending in an extension direction of the pair of guide rails 1 at a position between the pair of guide rails 1 in the first direction X, and an opening and closing body 2 configured to move along the guide path R.

In the following, a first direction-first side X1 is one side in the first direction X, and a first direction-second side X2 is the other side in the first direction X. A second direction Y is a direction orthogonal to the first direction X as viewed in the vertical direction, a second direction-first side Y1 is one side in the second direction Y, and a second direction-second side Y2 is the other side in the second direction Y.

As shown in FIGS. 2 and 3, the pair of guide rails 1 are disposed overlapping each other as viewed in the first direction X. Also, opposite end portions of the opening and closing body 2 in the first direction X are guided by the pair of guide rails 1.

In the present embodiment, each of the two guide rails 1 includes a first rail part 11 extending in the vertical direction, a ceiling rail part 1*c* extending in the second direction Y above the first rail part 11, and a first arcuate rail part 110 formed in an arcuate shape as viewed in the first direction X in such a manner as to connect an upper end portion of the first rail part 11 and an end portion of the ceiling rail part 1*c* on the second direction-first side Y1. In addition, each of the two guide rails 1 includes a second rail part 12 spaced apart from the first rail part 11 toward the second direction-second side Y2 and extending in the vertical direction, and a second arcuate rail part 120 formed in an arcuate shape as viewed in the first direction X in such a manner as to connect an upper end portion of the second rail part 12 and an end portion of the ceiling rail part 1*c* on the second direction-second side Y2. The first rail part 11 is disposed on the second direction-first side Y1 relative to the article placement portion 8. The ceiling rail part 1*c* is disposed above the article placement portion 8. The second rail part 12 is disposed on the second direction-second side Y2 relative to the article placement portion 8. In the illustrated example, the first rail part 11 and the second rail part 12 are disposed parallel to the vertical direction, but may be inclined with respect to the vertical direction. In the illustrated example, the ceiling rail part 1*c* is disposed parallel to the horizontal direction, but may be inclined with respect to the horizontal direction.

The guide path R is a planar virtual path formed between the pair of guide rails 1 in the first direction X, and along which the opening and closing body 2 is guided. That is, the guide path R corresponds to a movement trajectory of the opening and closing body 2 that moves along the pair of guide rails 1.

As shown in FIGS. 2 and 3, in the present embodiment, the guide path R includes a first region R1 extending in the vertical direction, a ceiling region RC extending in the second direction Y above the first region R1, and a first arcuate region R10 formed in an arcuate shape as viewed in the first direction X in such a manner as to connect an upper end portion of the first region R1 and an end portion of the ceiling region RC on the second direction-first side Y1. In addition, the guide path R includes a second region R2 spaced apart from the first region R1 toward the second direction-second side Y2 and extending in the vertical direction, and a second arcuate region R20 formed in an arcuate shape as viewed in the first direction X in such a manner as to connect an upper end portion of the second region R2 and an end portion of the ceiling region RC on the second direction-second side Y2. The first region R1 is disposed on the second direction-first side Y1 relative to the article placement portion 8. The ceiling region RC is disposed above the article placement portion 8. The second region R2 is disposed on the second direction-second side Y2 relative to the article placement portion 8. In the illustrated example, the first region R1 and the second region R2 are disposed parallel to the vertical direction, but may be inclined with respect to the vertical direction. In the illustrated example, the ceiling region RC is disposed parallel to the horizontal direction, but may be inclined with respect to the horizontal direction.

In the present embodiment, the first region R1 corresponds to a region sandwiched between a pair of first rail parts 11. The first arcuate region R10 corresponds to a region sandwiched between a pair of first arcuate rail parts 110. The ceiling region RC corresponds to a region sandwiched between a pair of ceiling rail parts 1*c*. The second arcuate region R20 corresponds to a region sandwiched between a pair of second arcuate rail parts 120. The second region R2 corresponds to a region sandwiched between a pair of second rail parts 12.

In the present embodiment, the article placement portion 8 on which the article 9 is placeable is provided between the first region R1 and the second region R2 in the second direction Y. Also, the article placement portion 8 is provided below the ceiling region RC. That is, in the present example, the article placement portion 8 is surrounded by the first region R1, the first arcuate region R10, the ceiling region RC, the second arcuate region R20, and the second region R2.

In the present embodiment, the work area WA in which work is performed on the article 9 placed on the article placement portion 8 is provided on the second direction-first side Y1 relative to the first region R1. As described above, in the present embodiment, the work platform Ws is provided in the work area WA. The worker W can perform, from the second direction-first side Y1, work on the article 9 placed on the article placement portion 8 while standing on the work platform Ws.

In the present embodiment, the transport area TA for transporting the article 9 to the article placement portion 8 is provided on the second direction-second side Y2 relative to the second region R2. As described above, in the present embodiment, the transport device T that transports the article 9 is disposed in the transport area TA. As described above, the transport device T is capable of entering, from the second direction-second side Y2, the area in which the article placement portion 8 is provided, and transferring the article 9 to and from the article placement portion 8.

In the present embodiment, at least one scaffold 82 for the worker W is provided between the first region R1 and the second region R2 in the second direction Y in a region surrounding the article placement portion 8. As shown in FIG. 1, in the present embodiment, scaffolds 82 are provided on opposite sides relative to the article placement portion 8 in the first direction X. Note that the work platform Ws is provided on the second direction-first side Y1 relative to the article placement portion 8. That is, in the present example, the worker W can enter regions on opposite sides in the first direction X and a region on the second direction-first side Y1 relative to the article placement portion 8, and can perform, from opposite sides in the first direction X and the second direction-first side Y1, work on the article 9 placed on the article placement portion 8. In addition, the worker W can perform maintenance of structures located in the surroundings of the article placement portion 8 by entering the scaffolds 82.

In the present embodiment, the opening and closing body 2 is configured to change between a first state (see FIG. 2) in which the opening and closing body 2 is disposed over the first region R1, the first arcuate region R10, and the ceiling region RC, and is not disposed in the second region R2, and a second state (see FIG. 3) in which the opening and closing body 2 is disposed over the ceiling region RC, the second arcuate region R20, and the second region R2, and is not disposed in the first region R1. In the present embodiment, the shutter 100 includes a drive source M that drives the opening and closing body 2 (see FIGS. 1 and 4), and the opening and closing body 2 is configured to change between the first state and the second state by being driven by the drive source M. The drive source M is formed by a motor, for example. Note that a portion of the opening and closing body 2 may be disposed in the second region R2 when the opening and closing body 2 is in the first state. A portion of the opening and closing body 2 may be disposed in the first region R1 when the opening and closing body 2 is in the second state.

As shown in FIG. 2, when the opening and closing body 2 is in the first state, the second region R2 is opened to enable the article 9 to be transported from the transport area TA to the article placement portion 8. In the present embodiment, the shutter 100 includes a shutter control device 5 that controls operations of the opening and closing body 2. The shutter control device 5 is configured to communicate with the transport device T (more specifically, a control device installed in the transport device T) or a transport control device that controls a plurality of transport devices T. For example, the transport device T is permitted to enter the area in which the article placement portion 8 is provided, in response to obtaining, from the shutter control device 5, information indicating that the opening and closing body 2 is in the first state. On the other hand, the transport device T is restricted from entering the area in which the article placement portion 8 is provided, in response to obtaining, from the shutter control device 5, information indicating that the opening and closing body 2 is in the second state.

As shown in FIG. 3, when the opening and closing body 2 is in the second state, the first region R1 is opened to enable work to be performed, from the work area WA, on the article 9 placed on the article placement portion 8. Although a detailed illustration has been omitted, in the present embodiment, when the opening and closing body 2 is in the second state, the shutter control device 5 notifies the worker W that the opening and closing body 2 is in the second state by at least one of visual means and audio means. Examples of the visual means include a rotating lamp. When the opening and closing body 2 is in the second state so that work can be performed from, the work area WA, on the article 9 placed on the article placement portion 8, the shutter control device 5 may light a blue lamp, for example. Conversely, when the opening and closing body 2 is in the first state so that work cannot be performed, from the area WA, on the article 9 placed on the article placement portion 8, the shutter control device 5 may light a red lamp, for example. Examples of the audio means include a speaker. When the opening and closing body 2 is in the second state so that work can be performed, from the work area WA, on the article 9 placed on the article placement portion 8, the shutter control device 5 may cause the speaker to emit a sound indicating that work can be performed safely, or cause the speaker to emit no sound. Conversely, when the opening and closing body 2 is in the first state so that work cannot be performed, from the work area WA, on the article 9 placed on the article placement portion 8, the shutter control device 5 may cause the speaker to emit an alarm sound.

Next, the configuration of the opening and closing body 2 will be described in detail.

The opening and closing body 2 includes a plurality of rod-shaped members 20 extending in the first direction X and arranged at an interval in a guide direction DR extending along the guide path R, and a plurality of coupling members 21 disposed in the guide direction DR and configured to couple the plurality of rod-shaped members 20. The plurality of rod-shaped members 20 are coupled together by the plurality of coupling members 21, thus forming the opening and closing body 2. In the present example, the coupling members 21 are coupled to a plurality of locations of each of the plurality of rod-shaped members 20 in the first direction X.

As shown in FIGS. 2 and 3, the size of the opening and closing body 2 in the guide direction DR is smaller than the size of the guide path R (or the guide rail 1) in the guide direction DR. Therefore, a region in which the rod-shaped members 20 and the coupling members 21, or in other words, the opening and closing body 2 is not present is present in a portion of the guide path R. Accordingly, the second region R2 of the guide path R is opened when the opening and closing body 2 is in the first state. Also, the first region R1 of the guide path R is opened when the opening and closing body 2 is in the second state.

Figure 4:
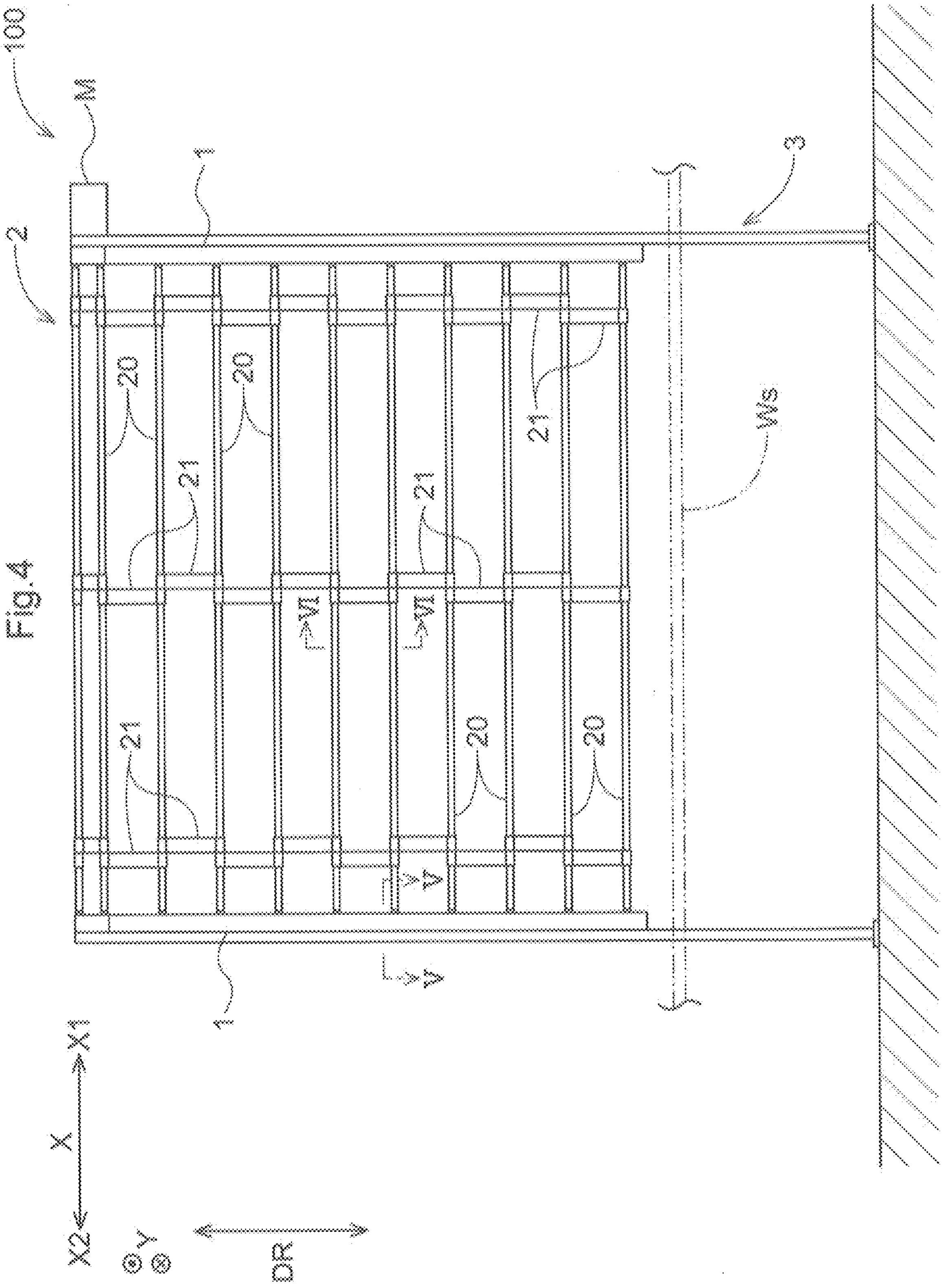
FIG. 4 is a view of the shutter as viewed in a second direction.
Figure 5:
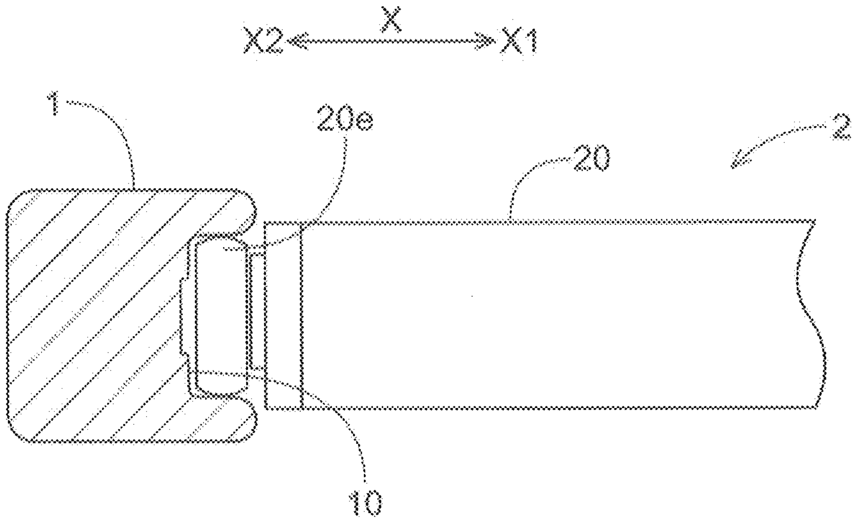
FIG. 5 is a cross-sectional view taken along the line V-V in FIG. 4.

As shown in FIG. 4, opposite end portions of each of the plurality of rod-shaped members 20 in the first direction X are respectively guided by the pair of guide rails 1 in such a manner as to be movable in the guide direction DR. In the present embodiment, as shown in FIG. 5, each of the two guide rails 1 includes a guide groove 10 extending in the guide direction DR. Each of the guide grooves 10 is opened toward the inner side of the corresponding guide rail 1 in the first direction X (the side on which the other guide rail 1 is disposed). Guided portions 20*e* are provided at opposite end portions of each of the rod-shaped members 20 in the first direction X. Each of the guided portions 20*e* is supported by the corresponding guide groove 10 in such a manner as to be movable in the guide direction DR. In the illustrated example, the guided portion 20*e* is formed using a roller.

Figure 6:
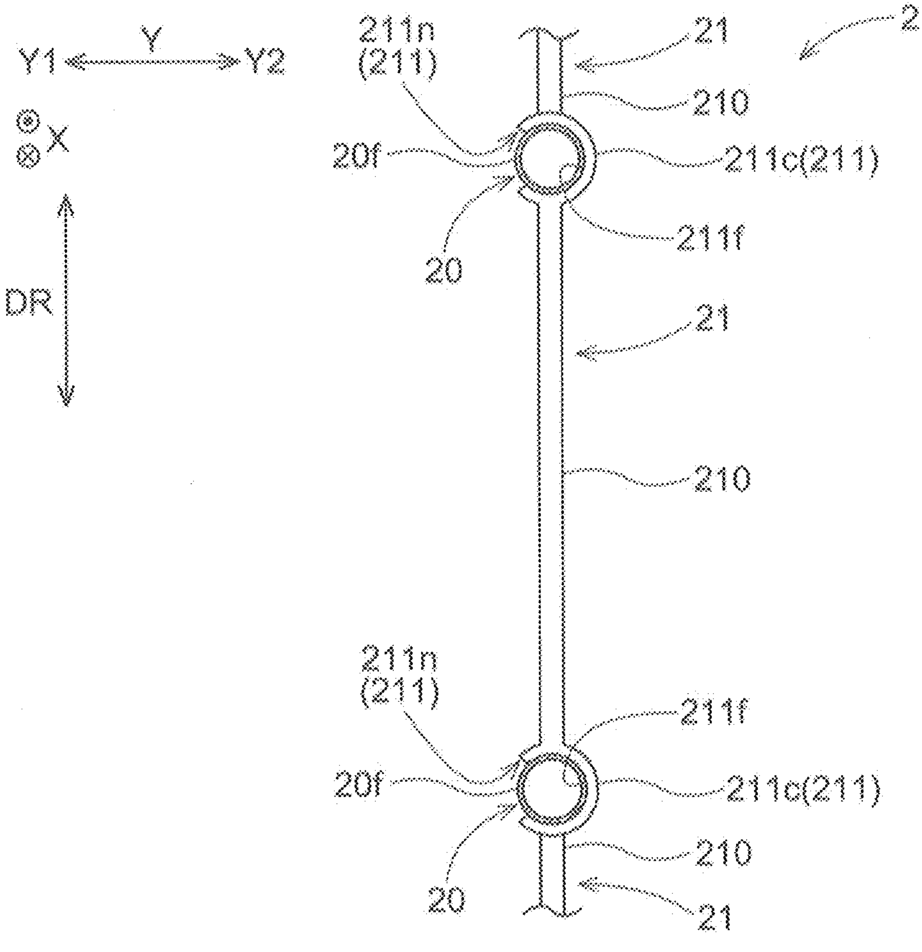
FIG. 6 is a cross-sectional view taken along the line VI-VI in FIG. 4.

As shown in FIG. 6, each of the coupling members 21 includes a pair of fitting parts 211 that are spaced apart in the guide direction DR and configured to be fitted to a coupling target pair of rod-shaped members 20 that are adjacent to each other in the guide direction DR. More specifically, each of the coupling members 21 includes a body part 210 extending in the guide direction DR, and fitting parts 211 formed at opposite end portions of the body part 210 in the guide direction DR. In the present embodiment, the body part 210 is formed in a band shape having a surface extending in the guide direction DR and the first direction X (see also FIG. 7).

To assemble the shutter 100, opposite end portions of each of the plurality of rod-shaped members 20 in the first direction X are respectively attached to the pair of guide rails 1, thereby arranging the plurality of rod-shaped members 20 in the guide direction DR. Then, the pair of fitting parts 211 of the corresponding coupling member 21 are fitted to a coupling target pair of rod-shaped members 20 that are adjacent to each other in the guide direction DR, thereby coupling the pair of rod-shaped members 20 that are adjacent to each other in the guide direction DR. In this manner, with the shutter 100 according to the present disclosure, the plurality of rod-shaped members 20 can be sequentially attached to the pair of guide rails 1. Accordingly, an assembly operation can be performed without the need of a wide space, unlike the case where one large opening and closing body is attached to the pair of guide rails. Furthermore, this assembly operation is performed in separate steps for each member, and therefore the number of workers can be easily reduced.

Each of the fitting parts 211 includes a cover part 211*c* having flexibility and configured to cover a range of an outer circumferential surface 20*f* of the fitted rod-shaped member 20, the range being smaller than a circumference of the outer circumferential surface 20*f* and larger than half the circumference as viewed in the first direction X. Each of the cover parts 211*c* has a shape formed by cutting out a part (specifically, a region smaller than a half circumference of the outer circumferential surface 20*f*) of a tubular portion surrounding the outer circumferential surface 20*f* of the rod-shaped member 20, as viewed in the first direction X.

In this manner, the cover part 211*c* of each of the fitting parts 211 has flexibility. Accordingly, when the fitting part 211 is pressed against the corresponding rod-shaped member 20 from a direction orthogonal to the first direction X to be fitted thereto, it is possible to temporarily enlarge a cut-out part 211*n*, where the cover part 211*c* is not formed, of the fitting part 211, thereby inserting the rod-shaped member 20 inside the cover part 211*c*. Also, the cover part 211*c* covers a range of the outer circumferential surface 20*f* of the rod-shaped member 20, the range being smaller than a circumference of the outer circumferential surface 20*f* and larger than half the circumference as viewed in the first direction X. Accordingly, after the rod-shaped member 20 has been fitted to the fitting part 211, the coupling member 21 is unlikely to be detached from the rod-shaped member 20.

In the present embodiment, each of the rod-shaped members 20 is formed by a solid or hollow round rod member, and the outer circumferential surface 20*f* is formed in a cylindrical shape. Each cover part 211*c* comes into contact with the outer circumferential surface 20*f* of the rod-shaped member 20 from outside, and covers a range of the outer circumferential surface 20*f* that is smaller than a circumference of the outer circumferential surface 20*f* and larger than half the circumference. In the present example, the outer circumferential surface 20*f* of each rod-shaped member 20 is formed in a cylindrical shape. Also, the cover part 211*c* is configured to cover the cylindrical outer circumferential surface 20*f* over a range spanning more than 180° and less than 360° of the outer circumferential surface 20*f* as viewed in the first direction X. The cover part 211*c* includes an inner circumferential surface 211*f* having a shape corresponding to the shape of the outer circumferential surface 20*f*. This can increase the area of contact of the cover part 211*c* with the outer circumferential surface 20*f* of the rod-shaped member 20, thus making it possible to firmly fitting the fitting part 211 to the rod-shaped member 20. As described above, in the present example, the outer circumferential surface 20*f* of the rod-shaped member 20 is formed in a cylindrical shape. Therefore, the inner circumferential surface 211*f* of the cover part 211*c* is formed in a circular arc shape as viewed in the first direction X. In the illustrated example, the cover part 211*c* has a shape formed by cutting out a circumferential portion (specifically, a circumferential region spanning less than 180°) of a cylindrical shape surrounding the outer circumferential surface 20*f* of the rod-shaped member 20.

Figure 7:
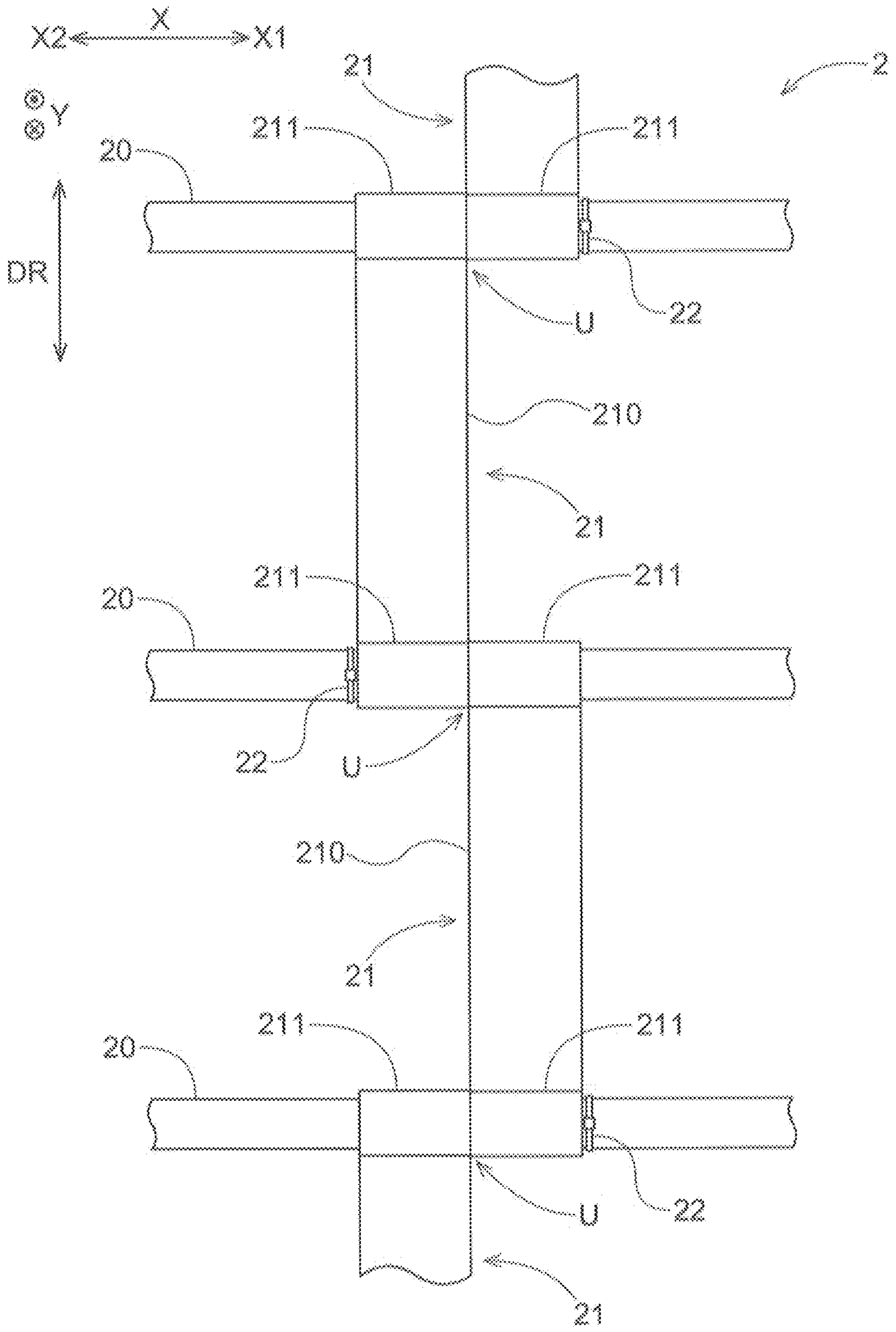
FIG. 7 is a partially enlarged view showing a portion of the opening and closing body as viewed in the second direction.

In the present embodiment, as shown in FIG. 7, the plurality of coupling members 21 are arranged in the guide direction DR while positions of the coupling members 21 in the first direction X are alternated with each other. Also, the respective fitting parts 211 of two coupling members 21 that are adjacent to each other in the guide direction DR are disposed in such a manner as to be fitted to the same rod-shaped member 20 and to be adjacent to each other in the first direction X. With such a configuration, even if the plurality of coupling members 21 all have the same shape, it is possible to appropriately couple the plurality of rod-shaped members 20. Accordingly, it is possible to further facilitate an operation of assembling the shutter 100. In the present example, all of the plurality of coupling members 21 that are arranged in the guide direction DR are disposed while positions of the coupling members 21 in the first direction X are alternated with each other.

In the present embodiment, two fitting parts 211 that are fitted to the same rod-shaped member 20 and that are adjacent to each other in the first direction X abut against each other in the first direction X. Accordingly, two coupling members 21 that are adjacent to each other in the guide direction DR, which correspond to the two fitting parts 211 that are adjacent to each other in the first direction X, can be easily handled as an integral structure. Therefore, it is possible to further facilitate an operation of assembling the shutter 100.

In the present embodiment, the opening and closing body 2 includes restriction members 22. The restriction members 22 are provided so as not to move in the first direction X relative to the corresponding rod-shaped members 20 and configured to restrict the coupling members 21 from moving in the first direction X relative to the rod-shaped members 20.

In the present embodiment, each of the restriction members 22 is a member separate from the rod-shaped members 20, and is configured to be attached to the rod-shaped members 20 from a direction orthogonal to the first direction X. Accordingly, the position of attachment of each of the restriction members 22 to the corresponding rod-shaped members 20 can be easily set freely. Therefore, after coupling each of the coupling members 21 to the corresponding rod-shaped member 20, the restriction member 22 can be attached to the rod-shaped member 20 according to the position of the coupling member 21. For example, each of the restriction members 22 is formed using Insulok (registered trademark).

In the present embodiment, the restriction members 22 are arranged in the guide direction DR while a position of each of the restriction members 22 in the first direction X relative to a fitting part set U including two of the fitting parts 211 that are fitted to the same rod-shaped member 20 and that are adjacent to each other in the first direction X is alternated between a position adjacent to the fitting part set U on the first direction-first side X1 and a position adjacent to the fitting part set U on the first direction-second side X2, for each of the plurality of rod-shaped members 20 arranged in the guide direction DR. That is, no restriction member 22 is disposed on the first direction-second side X2 of a fitting part set U for which a restriction member 22 is disposed on the first direction-first side X1 thereof. Similarly, no restriction member 22 is disposed on the first direction-first side X1 of a fitting part set U for which a restriction member 22 is disposed on the first direction-second side X2 thereof.

For another fitting part set U that is adjacent, in the guide direction DR, to a fitting part set U for which a restriction member 22 is disposed on the first direction-first side X1 thereof, a restriction member 22 is disposed on the first direction-second side X2 of the other fitting part set U. For another fitting part set U that is adjacent, in the guide direction DR, to a fitting part set U for which a restriction member 22 is disposed on the first direction-second side X2 thereof, a restriction member 22 is disposed on the first direction-first side X1 of the other fitting part set U.

With the above-described configuration, for each of a plurality of fitting part sets U, a restriction member 22 is placed at only one of a position adjacent to the fitting part set U on the first direction-first side X1 and a position adjacent to the fitting part set U on the first direction-second side X2, whereby it is possible to restrict each of the plurality of fitting part sets U from moving to either the first direction-first side X1 or and the first direction-second side X2. Accordingly, it is possible to appropriately fix the coupling members 21 to the rod-shaped members 20, while keeping the number of restriction members 22 small.

Figure 8:
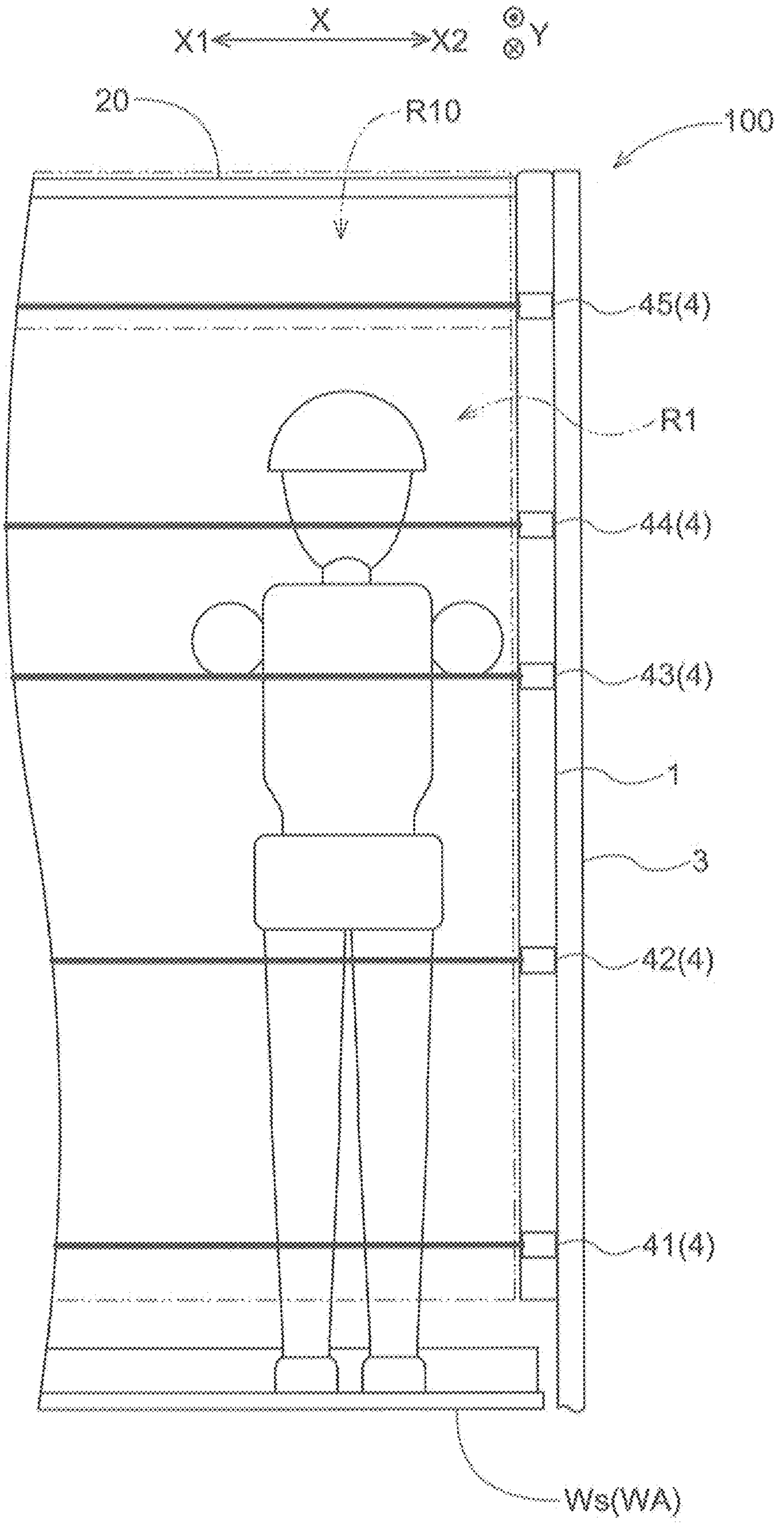
FIG. 8 is a view showing a placement position of a detection device as viewed in the second direction.

As shown in FIG. 8, in the present embodiment, the shutter 100 includes a detection device 4 that detects an object passing through the first region R1 from the work area WA. As described above, in the present embodiment, the work area WA is provided on the second direction-first side Y1 relative to the first region R1 (see FIGS. 2 and 3). The worker W can perform, from the work area WA, work on the article 9 placed on the article placement portion 8. However, in a situation where it is difficult to ensure the safety of the worker W, it is preferable that the above-described work is not performed by the worker W. In the present embodiment, for example, when a part of the body of the worker W has passed through the first region R1 from the work area WA in such a situation, the detection device 4 can detect the passage. In this case, for example, it is preferable to stop the transport of the article 9 in the transport area TA, or to alert the facility manager or the worker W by emitting an alarm sound. Note that other than the worker W, an "object" that is to be detected by the detection device 4 may be a work robot if the work robot is provided in the work area WA, or may be the article 9 or the like.

In the present embodiment, the detection device 4 is configured to detect the object at plurality of locations in the first region R1 that are spaced apart in the vertical direction. In the present example, the detection device 4 is configured to detect the object also in the first arcuate region R10.

In the present embodiment, the detection device 4 includes a first detector 41, a second detector 42, a third detector 43, a fourth detector 44, and a fifth detector 45 that are disposed at heights different from each other. In the present example, the first detector 41, the second detector 42, the third detector 43, the fourth detector 44, and the fifth detector 45 are attached to the guide rails 1. In the present example, the first detector 41, the second detector 42, the third detector 43, the fourth detector 44, and the fifth detector 45 are each formed using a photosensor including a light receiving part and a light projecting part, and projects detection light in the first direction X.

In the example shown in FIG. 8, the first detector 41 and the second detector 42 are configured to detect an object below a central portion of the first region R1 in the vertical direction. For example, using the height (approximately 170 cm) of a typical adult male as a reference, the first detector 41 is configured to detect an object at a height in the vicinity of the knees of the worker W. The second detector 42 is configured to detect an object at a height in the vicinity of the base of the legs of the worker W.

The third detector 43 and the fourth detector 44 are configured to detect an object above a central portion of the first region R1 in the vertical direction. The third detector 43 is configured to detect an object at a height in the vicinity of the chest of the worker W. The fourth detector 44 is configured to detect an object at a height in the vicinity of the head of the worker W.

The fifth detector 45 is configured to detect an object in the first arcuate region R10. The fifth detector 45 can detect an object trapped by the opening and closing body 2 that is retracted upward from the first region R1.

The shutter 100 described above allows an assembly operation to be performed relatively easily even when including a large opening and closing body 2.

Second Embodiment

Next, a second embodiment of the shutter will be described. The following description focuses mainly on differences from the above first embodiment. The aspects that are not specifically described are the same as those of the above first embodiment.

Figure 9:
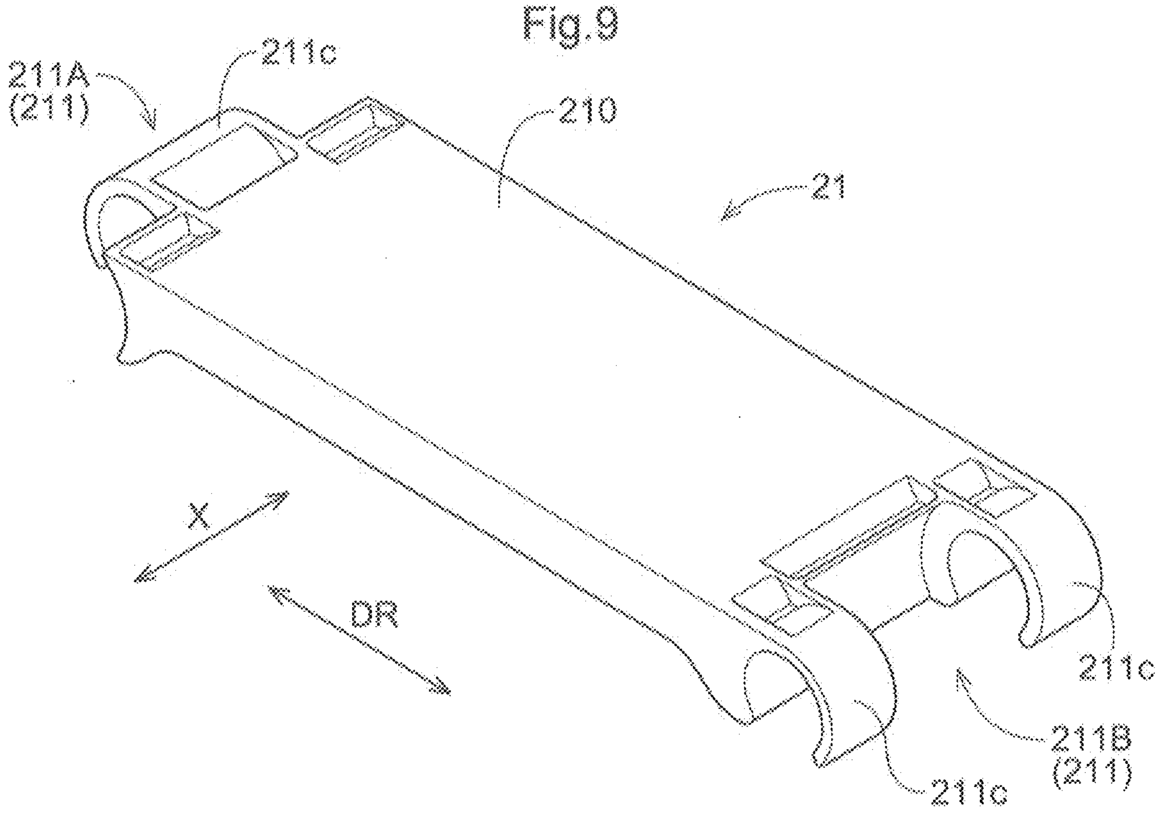
FIG. 9 is a perspective view of a coupling member as viewed from the front surface side thereof, according to a second embodiment.
Figure 10:
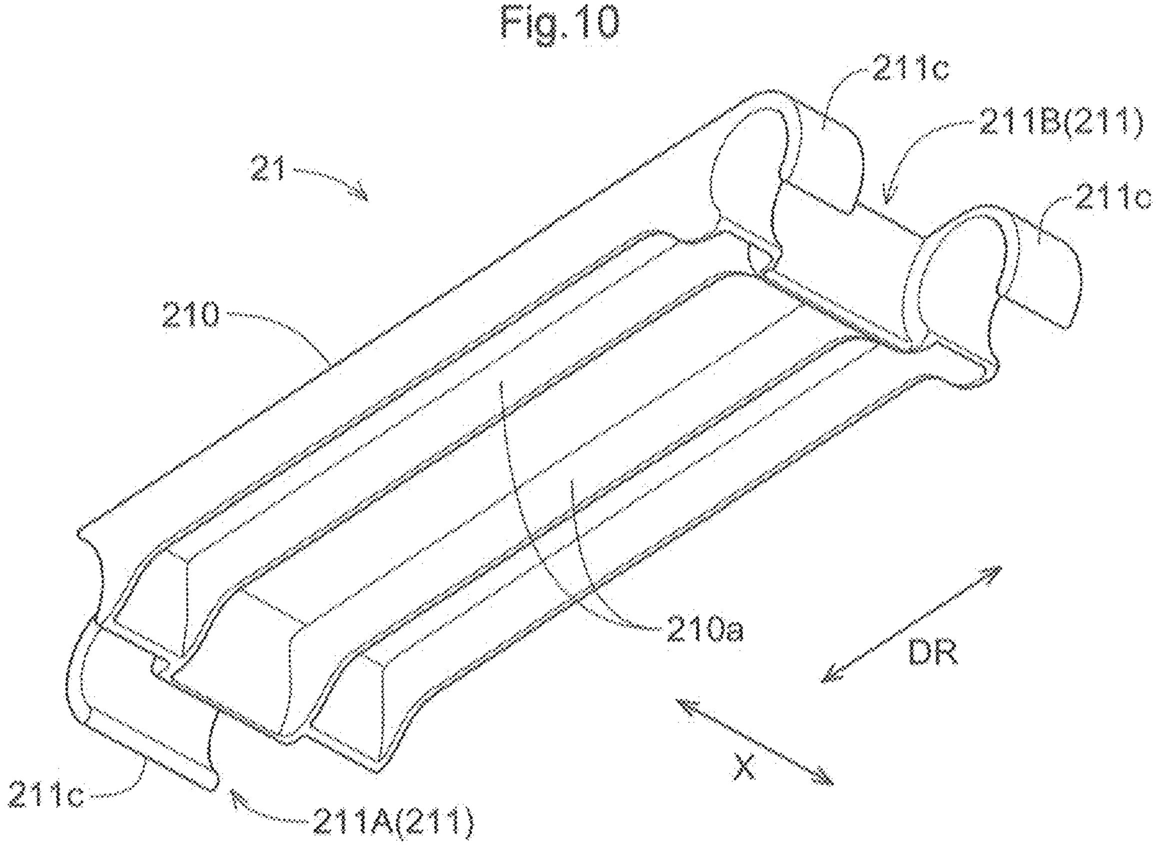
FIG. 10 is a perspective view of the coupling member as viewed from the back surface side thereof, according to the second embodiment.

FIG. 9 is a perspective view of a coupling member 21 as viewed from the front surface side thereof. FIG. 10 is a perspective view of the coupling member 21 as viewed from the back surface side thereof. Here, the "front surface" is a surface of a coupling member 21 that faces the outside of the shutter 100, while the coupling member 21 is attached to a rod-shaped member 20. The "back surface" is a surface of a coupling member 21 that faces the inside of the shutter 100 (the space surrounded by the shutter 100), while the coupling member 21 is attached to a rod-shaped member 20. As shown in FIG. 2 and so forth, the transport area TA and the work area WA are provided outside the shutter 100, and the article placement portion 8 is provided inside the shutter 100.

As shown in FIGS. 9 and 10, each of the coupling members 21 includes a body part 210 extending in the guide direction DR, and fitting parts 211 formed at opposite end portions of the body part 210 in the guide direction DR. In the present embodiment, the pair of fitting parts 211 have shapes different from each other, and have complementary shapes. Whereas a plurality of coupling members 21 are arranged in the guide direction DR while positions of the coupling members 21 in the first direction X are alternated with each other in the first embodiment described above, a plurality of coupling members 21 are arranged in the guide direction DR at the same position in the first direction X in the present embodiment.

In the present embodiment, a first fitting part 211A refers to one of the two fitting parts 211 of each of the coupling members 21, and a second fitting part 211B refers to the other of the two fitting parts 211. The first fitting part 211A and the second fitting part 211B have complementary shapes. Specifically, the first fitting part 211A and the second fitting part 211B have complementary shapes as viewed in a direction orthogonal to both the first direction X and the guide direction DR (see FIG. 11).

In the present embodiment, the number of cover parts 211*c* that the first fitting part 211A includes, and the number of cover parts 211*c* that the second fitting part 211B includes are different. In the present example, the first fitting part 211A includes N (N is a natural number) cover parts 211*c*, and the second fitting part 211B includes N+1 cover parts 211*c*. In the illustrated example, the first fitting part 211A includes one cover part 211*c*, and the second fitting part 211B includes two cover parts 211*c*.

The cover part 211*c* of the first fitting part 211A and the cover parts 211*c* of the second fitting part 211B are disposed at different positions in the first direction X. In the present embodiment, the cover part 211$c$ of the first fitting part 211A and the cover parts 211$c$ of the second fitting part 211B are disposed at different positions in the first direction X within a predetermined width Lx described below (see FIG. 11). In the illustrated example, the cover part 211$c$ of the first fitting part 211A is provided at a central portion of the body part 210 in the first direction X. The pair of cover parts 211$c$ of the second fitting part 211B are provided at opposite end portions of the body part 210 in the first direction X.

Each of the plurality of coupling members 21 arranged in the guide direction DR is disposed facing the same side in the guide direction DR. Specifically, each of the plurality of coupling members 21 is disposed such that the first fitting part 211A faces one side in the guide direction DR, and the second fitting part 211B faces the other side in the guide direction DR.

Figure 11:
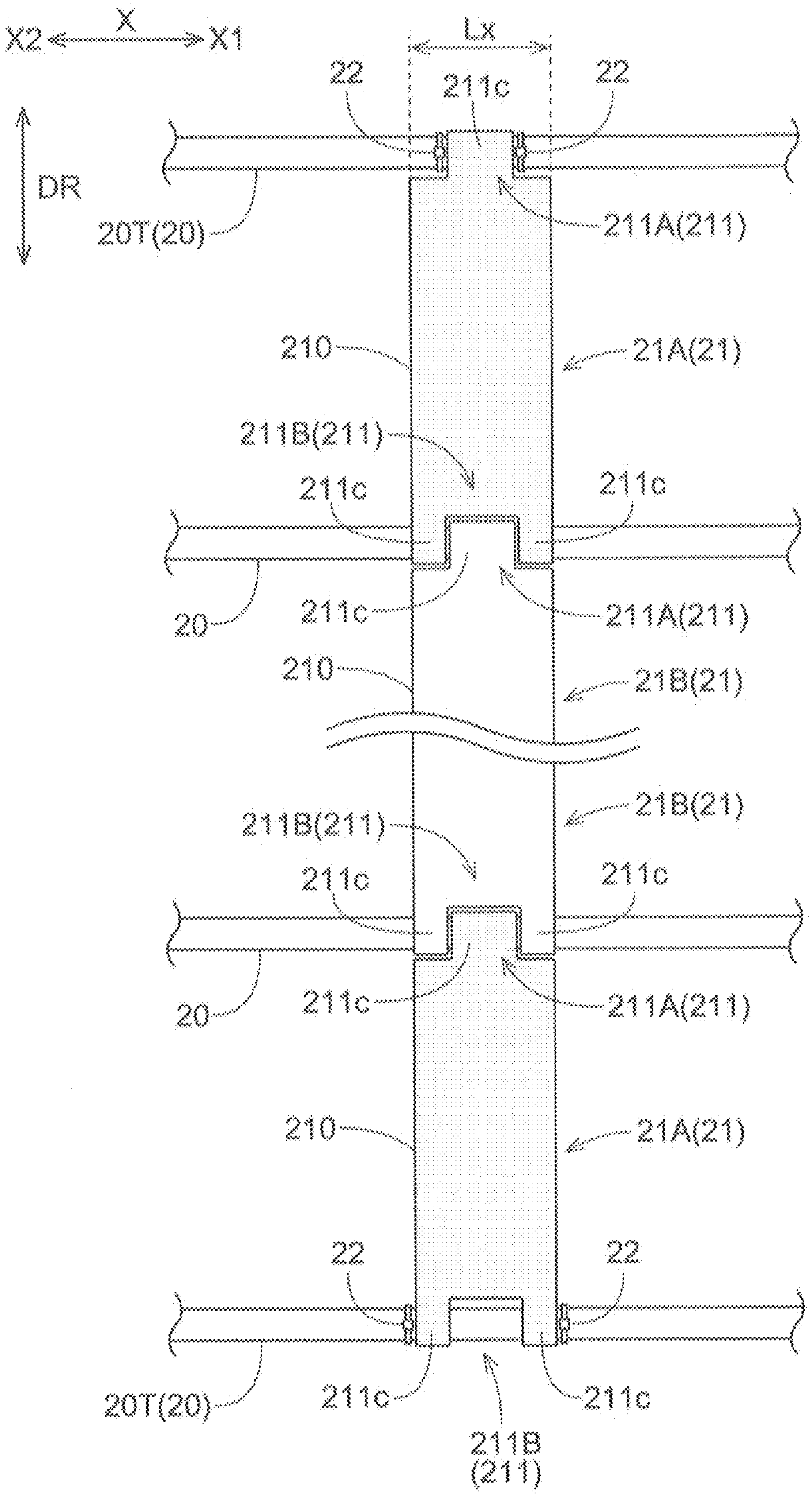
FIG. 11 is a partially enlarged view showing an opening and closing body as viewed in the second direction, according to the second embodiment.

As shown in FIG. 11, the respective fitting parts 211 of a pair of coupling members 21 that are adjacent to each other in the guide direction DR are fitted to the same rod-shaped member 20. That is, the first fitting part 211A of one of the two coupling members 21, and the second fitting part 211B of the other coupling member 21 are fitted to the same rod-shaped member 20. However, only one of the first fitting part 211A and the second fitting part 211B is fitted to the two rod-shaped members 20 (target rod-shaped members 20T described below) disposed at opposite ends in the guide direction DR among all of the rod-shaped members 20.

As described above, the cover part 211$c$ of the first fitting part 211A is provide at a central portion of the body part 210 in the first direction X. The pair of parts 211$c$ of the second fitting part 211B are provided at opposite end portions of the body part 210 in the first direction X. Accordingly, the cover part 211$c$ of the first fitting part 211A and the pair of cover parts 211$c$ of the second fitting part 211B are disposed adjacent to each other in the first direction X on the same rod-shaped member 20. In the present example, the first fitting part 211A and the second fitting part 211B have complementary shapes in such a configuration. In the present embodiment, the first fitting part 211A of the first coupling member 21A and the second fitting part 211B of the second coupling member 21B that are fitted to the same rod-shaped member 20 are disposed in such a manner as to be fitted to each other in the first direction X. In addition, the first fitting part 211A of the second coupling member 21B and the second fitting part 211B of the first coupling member 21A that are fitted to the same rod-shaped member 20 are disposed in such a manner as to be fitted to each other in the first direction X.

As shown in FIG. 10, each of the coupling members 21 includes at least one reinforcing rib 210$a$ protruding from the body part 210 to the front surface side or the back surface side. In the present embodiment, the reinforcing rib 210$a$ is formed protruding from the body part 210 to the back surface side. In the present example, the reinforcing rib 210$a$ is formed extending in the guide direction DR. In the illustrated example, a pair of reinforcing ribs 210$a$ disposed parallel to each other are formed on the back surface side of the body part 210.

As shown in FIG. 11, in the present embodiment, a first coupling member 21A is one of two coupling members 21 that are adjacent to each other in the guide direction DR, and a second coupling member 21B is the other of the two coupling members 21. The first coupling member 21A and the second coupling member 21B are coupled to the same rod-shaped member 20. The first fitting part 211A of the first coupling member 21A and the second fitting part 211B of the second coupling member 21B are fitted to each of the plurality of rod-shaped members 20, or the second fitting part 211B of the first coupling member 21A and the first fitting part 211A of the second coupling member 21B are fitted to each of the plurality of rod-shaped members 20. The first fitting part 211A and the second fitting part 211B are disposed adjacent to each other in the first direction X on the same rod-shaped member 20.

In the present embodiment, at least one of the first fitting part 211A and the second fitting part 211B is formed in such a manner as to sandwich at least a portion of the other from opposite sides in the first direction X. In the present example, the second fitting part 211B is formed in such a manner as to sandwich the first fitting part 211A from opposite sides in the first direction X on the same rod-shaped member 20. Specifically, the pair of cover parts 211$c$ of each of the second fitting parts 211B are formed in such a manner as to sandwich the cover part 211$c$ of the corresponding first fitting part 211A from opposite sides in the first direction X. The pair of cover parts 211$c$ of the second fitting part 211B and the cover part 211$c$ of the first fitting part 211A are disposed adjacent to each other in the first direction X on the same rod-shaped member 20 and alternately in the first direction X.

In the present embodiment, target rod-shaped members 20T are the two rod-shaped members 20 disposed at opposite ends in the guide direction DR among all of the rod-shaped members 20. In the present embodiment, the restriction members 22 are provided only on the two target rod-shaped members 20T, and are disposed on each of the target rod-shaped members 20T in such a manner as to sandwich, from opposite sides in the first direction X, the first fitting part 211A or the second fitting part 211B that is fitted to the corresponding target rod-shaped member 20T. No restriction member 22 is disposed on the rod-shaped members 20 other than the target rod-shaped members 20T.

As described above, each of the plurality of coupling members 21 that are arranged in the guide direction DR is disposed facing the same side in the guide direction DR. Accordingly, the first fitting part 211A is fitted to the target rod-shaped member 20T disposed at one end in the guide direction DR, and the second fitting part 211B is fitted to the target rod-shaped member 20T disposed at the other end, among all of the rod-shaped members 20.

The first fitting part 211A that is fitted to one of the target rod-shaped members 20T includes one cover part 211$c$. Restriction members 22 are disposed on opposite sides of the cover part 211$c$ of the first fitting part 211A in the first direction X.

The second fitting part 211B that is fitted to the other target rod-shaped member 20T includes a pair of cover parts 211$c$. A restriction member 22 is disposed outward of each of the two cover parts 211$c$ of the second fitting part 211B in the first direction X. No restriction member 22 is disposed inward of each of the two cover parts 211$c$ in the first direction X.

In the present embodiment, the plurality of first coupling members 21A and the plurality of second coupling members 21B that are arranged in the guide direction DR are, as a whole, formed in a band shape extending in the guide direction DR within a predetermined width Lx in the first direction X. The "predetermined width Lx" corresponds to the size of the body part 210 of the coupling member 21 in the first direction X. In the present embodiment, the predetermined width Lx is comparable to the size of the body part 210 in the first direction X (design errors or the like are tolerated).

In the present embodiment, the first fitting part 211A and the second fitting part 211B that are fitted to the same rod-shaped member 20 are disposed within the predetermined width Lx. In the present example, the cover part 211*c* of the first fitting part 211A and the pair of cover parts 211*c* of the second fitting part 211B are disposed adjacent to each other in the first direction X within the predetermined width Lx on the same rod-shaped member 20.

Other Embodiments

Next, other embodiments of the shutter will be described.

(1) The above first embodiment has described an example in which all of the plurality of coupling members 21 that are arranged in the guide direction DR are disposed while positions of the coupling members 21 in the first direction X are alternated with each other. However, the present disclosure is not limited to such an example, and only some of the plurality of coupling members 21 arranged in the guide direction DR may be disposed while positions of the coupling members 21 in the first direction X are alternated with each other.

(2) The above first embodiment has described an example in which each of the rod-shaped members 20 includes an outer circumferential surface 20*f* having a cylindrical shape. However, the present disclosure is not limited to such an example, and the rod-shaped member 20 may include an outer circumferential surface 20*f* having a polygonal tubular shape. Here, examples of the polygonal tubular shape include a quadrangular shape, a hexagonal shape, and an octagonal shape as viewed in the first direction X. In this case, the inner circumferential surface 211*f* of each of the fitting parts 211 (cover parts 211*c*) of each of the coupling members 21 may have a shape corresponding to an outer circumferential surface 20*f* having a polygonal tubular shape, or may be formed in a circular arc shape as viewed in the first direction X as in the above-described case.

(3) The above first embodiment has described an example in which the restriction members 22 are arranged in the guide direction DR while a position of each of the restriction members 22 in the first direction X relative to the fitting part set U is alternated between a position adjacent to the fitting part set U on the first direction-first side X1, and a position adjacent to the fitting part set U on the first direction-second side X2, for each of the plurality of rod-shaped members 20 arranged in the guide direction DR. However, the present disclosure is not limited to such an example, and the restriction members 22 may be disposed at both a position adjacent to the fitting part set U on the first direction-first side X1 and a position adjacent to the fitting part set U on the first direction-second side X2.

(4) The above first embodiment has described an example in which each of the restriction members 22 is formed using Insulok (registered trademark). However, the present disclosure is not limited to such an example, and the restriction member 22 may be, for example, a pin, a bolt, or the like that can be attached to the rod-shaped member 20.

(5) The above first embodiment has described an example in which each of the restriction members 22 is a member separate from the rod-shaped members 20, and is configured to be attached to the rod-shaped members 20 from a direction orthogonal to the first direction X. However, the present disclosure is not limited to such an example, and the restriction member 22 (restrictor) may be formed as a part of the rod-shaped member 20. In this case, the restrictor may be formed protruding from the outer circumferential surface 20*f* of the rod-shaped member 20 toward a direction orthogonal to the first direction X, for example. Such a configuration also can restrict the coupling member 21 from moving in the first direction X relative to the rod-shaped member 20.

(6) The above first embodiment has described an example in which the opening and closing body 2 includes restriction members 22 configured to restrict the coupling members 21 from moving in the first direction X relative to the rod-shaped members 20. However, the present disclosure is not limited to such an example, and the opening and closing body 2 need not include the above-described restriction members 22.

(7) The above first embodiment has described an example in which the guide path R includes a first region R1, a ceiling region RC, a first arcuate region R10, a second region R2, and a second arcuate region R20. However, the present disclosure is not limited to such an example, and the guide path R may include only a region extending in the vertical direction, for example. With an opening and closing body 2 disposed along such a guide path R, the areas also can be separated from each other in the horizontal direction. Alternatively, the guide path R may include only a region extending in the horizontal direction. With an opening and closing body 2 disposed along such a guide path R, the areas can be separated from each other in the vertical direction. In accordance therewith, each of the two guide rails 1 also may include only a portion extending in the vertical direction, or may include only a portion extending in the horizontal direction. Note that the guide path R may be configured to not to include the second region R2 and the second arcuate region R20, while including the first region R1, the ceiling region RC, and the first arcuate region R10.

(8) The above first embodiment has described an example in which the shutter 100 includes a detection device 4 that detects an object passing through the first region R1 from the work area WA. However, the present disclosure is not limited to such an example, and the shutter 100 need not include the above-described detection device 4.

(9) The above first embodiment has described an example in which at least one scaffold 82 for the worker W is provided between the first region R1 and the second region R2 in the second direction Y in a region surrounding the article placement portion 8. However, the present disclosure is not limited to such an example, and the scaffold 82 for the worker W need not be provided in a region surrounding the article placement portion 8.

(10) The above first embodiment has described an example in which the shutter 100 includes a drive source M that drives the opening and closing body 2. However, the present disclosure is not limited to such an example, and the shutter 100 need not include the above-described drive source M. In this case, the opening and closing body 2 may be configured to be opened and closed manually. The configuration including the detection device 4 described above is particularly preferable when the opening and closing body 2 is opened and closed manually as in this case.

(11) The above first embodiment has described an example in which the article placement portion 8 includes a plurality of struts 80 disposed in the vertical direction, and an article receiving portion 81 provided on an upper portion of each of the struts 80. However, the present disclosure is not limited to such an example, the article placement portion 8 need only be configured such that the article 9 can be placed thereon. The article placement portion 8 may be formed, for example, by a conveyor or the like as long as the article 9 can be placed thereon.

(12) The above first embodiment has described an example in which the transport device T is configured as a trackless or tracked automated guided vehicle. However, the present disclosure is not limited to such an example. For example, the transport device T may be a stacker crane or the like, or may be a manned transport device such as a forklift.

Figure 12:
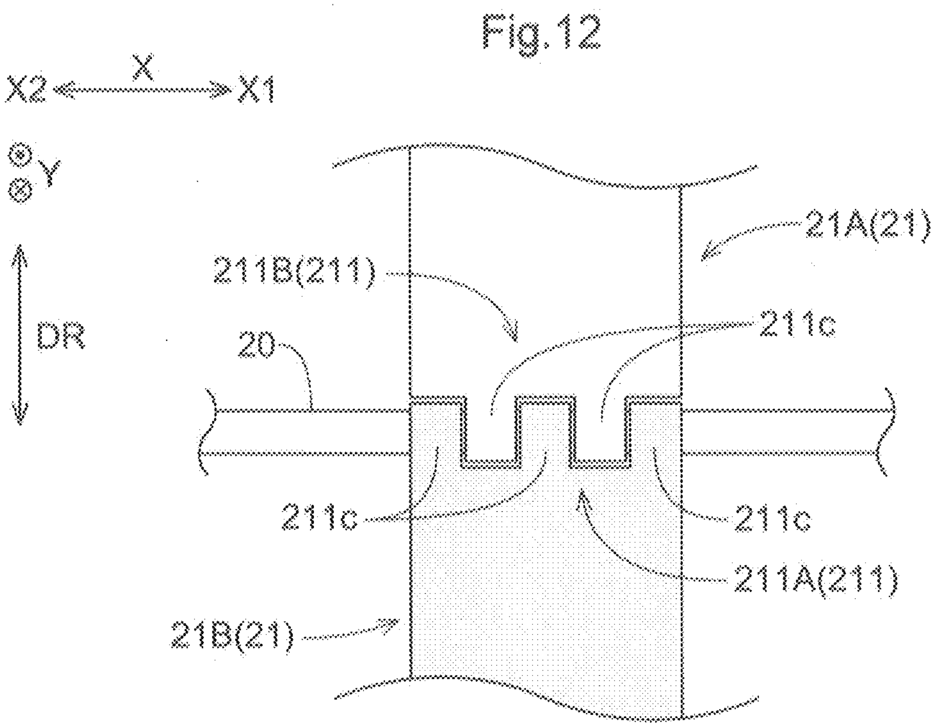
FIG. 12 is a view showing fitting parts of coupling members as viewed in the second direction, according to another embodiment.

(13) The above second embodiment has described an example in which the first fitting part 211A includes one cover part 211*c*, and the second fitting part 211B includes two cover parts 211*c* in the case where the number of cover parts 211*c* that the first fitting part 211A includes and the number of cover parts 211*c* that the second fitting part 211B includes are different. However, the present disclosure is not limited to such an example. In the case where the two fitting parts 211 include different numbers of cover parts 211*c*, the numbers may be freely set. For example, as shown in FIG. 12, the first fitting part 211A may include three cover parts 211*c*, and the second fitting part 211B may include two cover parts 211*c*.

Figure 13:
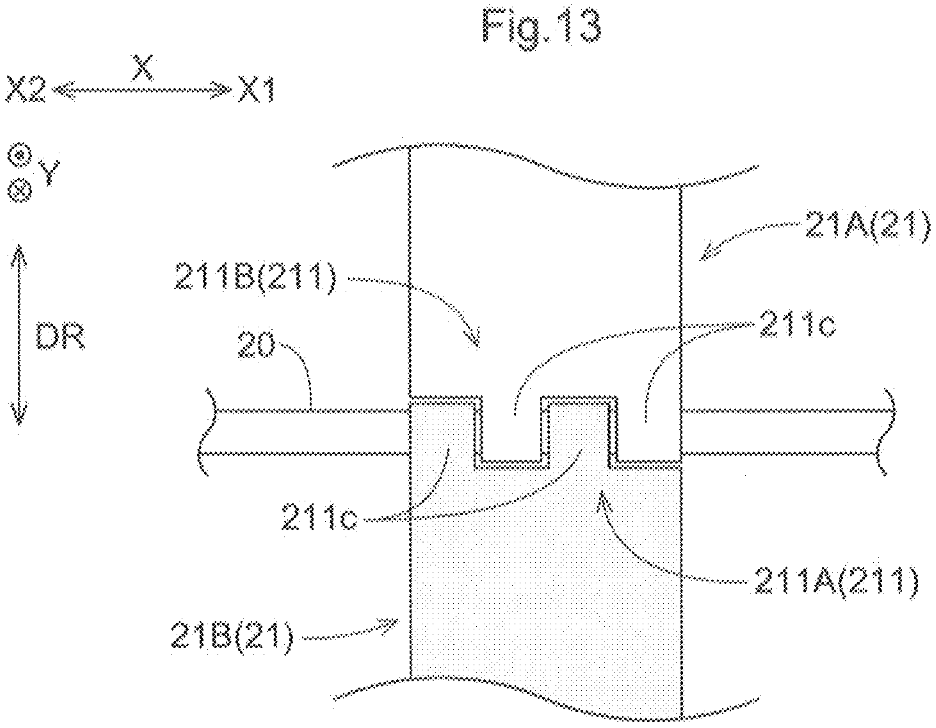
FIG. 13 is a view showing fitting parts of coupling members as viewed in the second direction, according to yet another embodiment.

(14) The above second embodiment has described an example in which the number of cover parts 211*c* that the first fitting part 211A includes, and the number of cover parts 211*c* that the second fitting part 211B includes are different. However, the present disclosure is not limited to such an example. For example, as shown in FIG. 13, the number of cover parts 211*c* that the first fitting part 211A includes, and the number of covers part 211*c* that the second fitting part 211B includes may be the same. In the example shown in FIG. 13, the two fitting part 211 each include two cover parts 211*c*. However, in the case where the respective numbers of cover parts 211*c* that the two fitting parts 211 include are the same, the number may be freely set.

Figure 14:
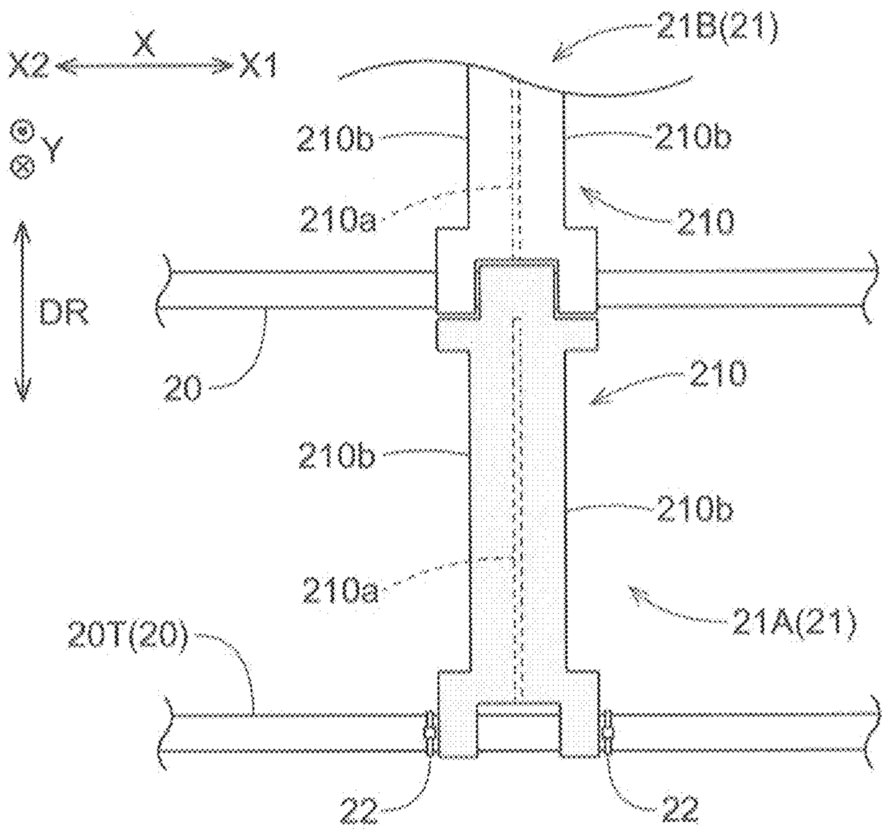
FIG. 14 is a view showing coupling members as viewed in the second direction, according to still another embodiment.

(15) The above second embodiment has described an example in which a pair of reinforcing ribs 210*a* that are disposed parallel to each other are formed on the back surface side of the body part 210. However, the present disclosure is not limited to such an example. For example, as shown in FIG. 14, only one reinforcing rib 210*a* may be provided at a central portion of the body part 210 in the first direction X. Since the rigidity of the body part 210 can be increased by the reinforcing rib 210*a* when the reinforcing rib 210*a* is provided on the body part 210, a cut-out part may be formed in a portion (portion where the reinforcing rib 210*a* is not provided) of the body part 210 other than a central portion in the first direction X. This can reduce the material cost of the coupling member 21. In the example shown in FIG. 14, body cut-out parts 210*b* are formed in opposite end portions of the body part 210 in the first direction X.

(16) Note that the configurations disclosed in the embodiments described above are applicable in combination with configurations disclosed in other embodiments as long as no inconsistency arises. With regard to the other configurations as well, the embodiments disclosed herein are illustrative in all respects. Therefore, various modifications and alterations may be made as appropriate without departing from the gist of the present disclosure.

Outline of the Embodiment

An outline of the shutter described above will be described below.

A shutter including:

a pair of guide rails spaced apart in a first direction extending in a horizontal direction;

a guide path extending in an extension direction of the pair of guide rails at a position between the pair of guide rails in the first direction; and an opening and closing body configured to move along the guide path, wherein the opening and closing body includes a plurality of rod-shaped members extending in the first direction and arranged at an interval in a guide direction extending along the guide path, and a plurality of coupling members disposed in the guide direction and configured to couple the plurality of rod-shaped members, opposite end portions of each of the plurality of rod-shaped members in the first direction are respectively guided by the pair of guide rails in such a manner as to be movable in the guide direction, each of the coupling members includes a pair of fitting parts that are spaced apart in the guide direction and configured to be fitted to a coupling target pair of rod-shaped members that are adjacent to each other in the guide direction, and each of the fitting parts includes a cover part having flexibility and configured to cover a range of an outer circumferential surface of the fitted rod-shaped member, the range being smaller than a circumference of the outer circumferential surface and larger than half the circumference as viewed in the first direction.

With this configuration, the opening and closing body includes a plurality of rod-shaped members and a plurality of coupling members. To assemble the shutter, opposite end portions of each of the plurality of rod-shaped members in the first direction X are respectively attached to a pair of guide rails, thereby arranging the plurality of rod-shaped members in the guide direction. Then, a pair of fitting parts of each of the corresponding coupling member are fitted to a coupling target pair of the rod-shaped members that are adjacent to each other in the guide direction, thereby coupling the pair of rod-shaped members that are adjacent to each other in the guide direction. In this manner, with this configuration, the plurality of rod-shaped members can be sequentially attached to the pair of guide rails. Accordingly, an assembly operation can be performed without the need of a wide space, unlike the case where one large opening and closing body is attached to the pair of guide rails. In addition, this assembly operation is performed in separate steps for each member, and therefore the number of workers can be easily reduced. Furthermore, with this configuration, the cover part of each of the fitting parts has flexibility. Accordingly, when the fitting part is pressed against the corresponding rod-shaped member from a direction orthogonal to the first direction in such a manner as to be fitted thereto, it is possible to temporarily enlarge a cut-out part, where the cover part is not formed, of the fitting part, thereby inserting the rod-shaped member inside the cover part. Also, the cover part covers a range of the outer circumferential surface of the rod-shaped member, the range being smaller than a circumference of the outer circumferential surface and larger than half the circumference as viewed in the first direction. Accordingly, after the rod-shaped member has been fitted to the fitting part, the coupling member is unlikely to be detached from the rod-shaped member. Therefore, the plurality of rod-shaped members can be coupled through a simple operation, thereby forming the opening and closing body. As described above, this configuration makes it possible to realize a shutter that allows an assembly operation to be performed relatively easily even when including a large opening and closing body.

It is preferable that, with a first fitting part being one of the two fitting parts of each of the coupling members, a second fitting part being another one of the two fitting parts, a first coupling member being one of two of the coupling members that are adjacent to each other in the guide direction, and a second coupling member being another one of the two adjacent coupling members, the first fitting part and the second fitting part have complementary shapes, and the first fitting part of the first coupling member and the second fitting part of the second coupling member that are fitted to a corresponding rod-shaped member are disposed in such a manner as to be fitted to each other in the first direction.

With this configuration, even if the plurality of coupling members all have the same shape, it is possible to appropriately couple the plurality of rod-shaped members. Also, as a result of the fitting parts of two coupling members that are adjacent to each other in the guide direction being fitted to each other in the first direction, it is possible to restrict the coupling members from moving in the first direction relative to each other. Accordingly, it is possible to prevent the respective positions of the plurality of coupling members arranged in the guide direction from being shifted in the first direction.

It is preferable that the opening and closing body includes restriction members provided so as not to move in the first direction relative to the rod-shaped members and configured to restrict the coupling members from moving in the first direction relative to the rod-shaped members, at least one of the first fitting part and the second fitting part sandwiches at least a portion of another one of the first fitting part and the second fitting part from opposite sides in the first direction, and the restriction members are provided only on target rod-shaped members that are the two rod-shaped members disposed at opposite ends in the guide direction among all of the rod-shaped members, and the restriction members are disposed on each of the target rod-shaped members in such a manner as to sandwich, from opposite sides in the first direction, the first fitting part or the second fitting part that is fitted to the target rod-shaped member.

With this configuration, it is possible to appropriately restrict each of the plurality of coupling members arranged in the guide direction from being shifted in the first direction, using a small number of restriction members.

It is preferable that, with a first fitting part being one of the two fitting parts of each of the coupling members, a second fitting part being another one of the two fitting parts, a first coupling member being one of two of the coupling members that are adjacent to each other in the guide direction, and a second coupling member being another one of the two adjacent coupling members, the first fitting part and the second fitting part have complementary shapes, and the plurality of first coupling members and the plurality of second coupling members that are arranged in the guide direction are formed, as a whole, in a band shape extending in the guide direction within a predetermined width in the first direction, and the first fitting portion and the second fitting portion that are fitted to a corresponding rod-shaped member are disposed within the predetermined width.

With this configuration, the region of the opening and closing body in which the plurality of coupling members are disposed in the first direction can be fitted within a predetermined width. Accordingly, if it is necessary to view the opposite side through the opening and closing body, the visibility can be easily ensured.

It is preferable that the plurality of coupling members are arranged in the guide direction while positions of the coupling members in the first direction are alternated with each other, and respective fitting parts of two of the coupling members that are adjacent to each other in the guide direction are disposed in such a manner as to be fitted to a corresponding rod-shaped member and to be adjacent to each other in the first direction.

With this configuration, even if the plurality of coupling members all have the same shape, it is possible to appropriately couple the plurality of rod-shaped members.

It is preferable that the opening and closing body includes restriction members provided so as not to move in the first direction relative to the rod-shaped members and configured to restrict the coupling members from moving in the first direction relative to the rod-shaped members, the restriction members are arranged in the guide direction while a position of each of the restriction members in the first direction relative to a fitting part set including two of the fitting parts that are fitted to the same rod-shaped member and that are adjacent to each other in the first direction is alternated between a position adjacent to the fitting part set on a first side in the first direction and a position adjacent to the fitting part set on a second side in the first direction, for each of the plurality of rod-shaped members arranged in the guide direction.

With this configuration, for each of a plurality of fitting part sets, a restriction member is placed at only one of a position adjacent to the fitting part set on the first direction-first side and a position adjacent to the fitting part set on the first direction-second side, whereby it is possible to restrict each of the plurality of fitting part sets from moving to either the first direction-first side or the first direction-second side. Accordingly, it is possible to appropriately fix the coupling members to the rod-shaped members, while keeping the number of restriction members small.

It is preferable that, the guide path includes a first region extending in a vertical direction, a ceiling region above the first region and extending in a second direction orthogonal to the first direction as viewed in the vertical direction, and a first arcuate region formed in an arcuate shape as viewed in the first direction in such a manner as to connect an upper end portion of the first region and an end portion of the ceiling region on a first side in the second direction, the guide path further includes a second region disposed spaced apart from the first region toward a second side in the second direction and extending in the vertical direction, and a second arcuate region formed in an arcuate shape as viewed in the first direction in such a manner as to connect an upper end portion of the second region and an end portion of the ceiling region on the second side in the second direction, and the opening and closing body is configured to change between a first state in which the opening and closing body is disposed over the first region, the first arcuate region, and the ceiling region, and is not disposed in the second region, and a second state in which the opening and closing body is disposed over the ceiling region, the second arcuate region, and the second region, and is not disposed in the first region.

With this configuration, the opening and closing body can be selectively moved such that, when one of the first region and the second region is opened, the other is closed.

It is preferable that an article placement portion on which an article is placeable is provided between the first region and the second region in the second direction, a work area in which work is performed on the article placed on the article placement portion is provided on the first side in the second direction relative to the first region, a transport area for transporting the article to the article placement portion is provided on the second side in the second direction relative to the second region, when the opening and closing body is in the first state, the second region is opened to enable the article to be transported from the transport area to the article placement portion, and, when the opening and closing body is in the second state, the first region is opened to enable work to be performed, from the work area, on the article placed on the article placement portion.

With this configuration, in the case where work from the work area is performed on the article placed on the article placement portion, it is possible to separate the area in which the article placement portion is provided and the transport area from each other by the opening and closing body disposed in the second region, while opening the first region. In the case where the transport of the article to the article placement portion is performed from the transport area, it is possible to separate the area in which the article placement portion is provided and the work area from each other by the opening and closing body disposed in the first region, while opening the second region. Accordingly, with this configuration, it is possible to prevent work on the article placement portion from the work area and the transport of the article from the transport area from being performed at the same time.

It is preferable that a transport device that transports the article is provided in the transport area, the transport device is configured to transport the article to the article placement portion, in the work area, a worker performs work on the article placed on the article placement portion, and a scaffold for the worker is provided between the first region and the second region in the second direction in a region surrounding the article placement portion.

With this configuration, the worker can use the scaffold provided in a region surrounding the article placement portion to perform work on the article placed on the article placement portion, or work such as maintenance of the surroundings of the article placement portion. In this case as well, it is possible to place the opening and closing body in the second region by keeping the opening and closing body in the second state. Accordingly, it is possible to prevent the article from being transported by the transport device provided in the transport area at the same time when work is performed by the worker.

It is preferable that the shutter further includes a detection device configured to detect an object passing through the first region from the work area, wherein the detection device is configured to detect the object at a plurality of locations in the first region that are spaced apart in the vertical direction.

With this configuration, while the first region is opened, if an object such as a work robot or a worker enters, from the work area, the area in which the article placement portion is provided, the detection device can detect the entry. If the detection device detects an object, it is possible, for example, to stop the transport of the article in the transport area, or to alert the facility manager or the worker by emitting an alarm sound.

Industrial Applicability

The technique according to the present disclosure is applicable to a shutter including a pair of guide rails spaced apart in a first direction extending in a horizontal direction, a guide path extending in an extension direction of the pair of guide rails between the pair of guide rails in the first direction, and an opening and closing body configured to move along the guide path.

What is claimed is:

1. A shutter comprising:

a pair of guide rails spaced apart in a first direction extending in a horizontal direction;

a guide path extending in an extension direction of the pair of guide rails at a position between the pair of guide rails in the first direction; and an opening and closing body configured to move along the guide path, wherein:

the opening and closing body comprises a plurality of rod-shaped members extending in the first direction and arranged at an interval in a guide direction extending along the guide path, and a plurality of coupling members disposed in the guide direction and configured to couple the plurality of rod-shaped members, opposite end portions of each of the plurality of rod-shaped members in the first direction are respectively guided by the pair of guide rails in such a manner as to be movable in the guide direction, each of the coupling members comprises a body part extending in a planar manner along the guide direction, a pair of fitting parts that are disposed at the body part, spaced apart in the guide direction, and configured to be fitted to a coupling target pair of rod-shaped members that are adjacent to each other in the guide direction, and one or more reinforcing ribs protruding from the body part from a front surface side or a back surface side and extending in a planar manner along the guide direction, opposite end walls of the body part in the first direction protrude from the back surface side in a planar manner, and each of the fitting parts comprises at least one cover part having flexibility and configured to cover a range of an outer circumferential surface of each rod-shaped member of the coupling target pair of rod-shaped members, the range being smaller than a circumference of the outer circumferential surface and larger than half the circumference as viewed in the first direction.

2. The shutter according to claim 1, wherein:

with a first fitting part being one of the two fitting parts of each of the coupling members, a second fitting part being another one of the two fitting parts, a first coupling member being one of two of the coupling members that are adjacent to each other in the guide direction, and a second coupling member being another one of the two adjacent coupling members, the first fitting part and the second fitting part have complementary shapes, and the first fitting part of the first coupling member and the second fitting part of the second coupling member that are fitted to a corresponding rod-shaped member are disposed in such a manner as to be fitted to each other in the first direction.

3. The shutter according to claim 2, wherein:

the opening and closing body comprises restriction members provided so as not to move in the first direction relative to the rod-shaped members and configured to restrict the coupling members from moving in the first direction relative to the rod-shaped members, at least one of the first fitting part and the second fitting part sandwiches at least a portion of another one of the first fitting part and the second fitting part from opposite sides in the first direction, and the restriction members are provided only on target rod-shaped members that are two of the rod-shaped members disposed at opposite ends in the guide direction among all of the rod-shaped members, and the restriction members are disposed on each of the target rod-shaped members in such a manner as to sandwich, from opposite sides in the first direction, the first fitting part or the second fitting part that is fitted to a target rod-shaped member of the coupling target pair of rod-shaped members.

4. The shutter according to claim 1, wherein:

with a first fitting part being one of the two fitting parts of each of the coupling members, a second fitting part being another one of the two fitting parts, a first coupling member being one of two of the coupling members that are adjacent to each other in the guide direction, and a second coupling member being another one of the two adjacent coupling members, the first fitting part and the second fitting part have complementary shapes, and a plurality of first coupling members and a plurality of second coupling members that are arranged in the guide direction are formed, as a whole, in a band shape extending in the guide direction within a predetermined width in the first direction, and the first fitting portion and the second fitting portion that are fitted to a corresponding rod-shaped member are disposed within the predetermined width.

5. The shutter according to claim 1, wherein the plurality of coupling members are arranged in the guide direction while positions of the coupling members in the first direction are alternated with each other, and wherein respective fitting parts of two of the coupling members that are adjacent to each other in the guide direction are disposed in such a manner as to be fitted to a corresponding rod-shaped member and to be adjacent to each other in the first direction.

6. The shutter according to claim 5, wherein the opening and closing body comprises restriction members provided so as not to move in the first direction relative to the rod-shaped members and configured to restrict the coupling members from moving in the first direction relative to the rod-shaped members, and the restriction members are arranged in the guide direction while a position of each of the restriction members in the first direction relative to a respective fitting part set of one or more fitting part sets including two of the fitting parts that are fitted to the same rod-shaped member and that are adjacent to each other in the first direction is alternated between a position adjacent to a fitting part set of one or more fitting part sets on a first side in the first direction and a position adjacent to a fitting part set of one or more fitting part sets on a second side in the first direction, for each of the plurality of rod-shaped members arranged in the guide direction.

7. The shutter according to claim 1, wherein:

the guide path includes a first region extending in a vertical direction, a ceiling region above the first region and extending in a second direction orthogonal to the first direction as viewed in the vertical direction, and a first arcuate region formed in an arcuate shape as viewed in the first direction in such a manner as to connect an upper end portion of the first region and an end portion of the ceiling region on a first side in the second direction, the guide path further includes a second region disposed spaced apart from the first region toward a second side in the second direction and extending in the vertical direction, and a second arcuate region formed in an arcuate shape as viewed in the first direction in such a manner as to connect an upper end portion of the second region and an end portion of the ceiling region on the second side in the second direction, and the opening and closing body is configured to change between a first state in which the opening and closing body is disposed over the first region, the first arcuate region, and the ceiling region, and is not disposed in the second region, and a second state in which the opening and closing body is disposed over the ceiling region, the second arcuate region, and the second region, and is not disposed in the first region.

8. The shutter according to claim 7, wherein:

an article placement portion on which an article is placeable is provided between the first region and the second region in the second direction, a work area in which work is performed on the article placed on the article placement portion is provided on the first side in the second direction relative to the first region, a transport area for transporting the article to the article placement portion is provided on the second side in the second direction relative to the second region, when the opening and closing body is in the first state, the second region is opened to enable the article to be transported from the transport area to the article placement portion, and, when the opening and closing body is in the second state, the first region is opened to enable work to be performed, from the work area, on the article placed on the article placement portion.

9. The shutter according to claim 8, wherein:

a transport device that transports the article is provided in the transport area, the transport device is configured to transport the article to the article placement portion, in the work area, a worker performs work on the article placed on the article placement portion, and a scaffold for the worker is provided between the first region and the second region in the second direction in a region surrounding the article placement portion.

10. The shutter according to claim 8, further comprising:

a detection device configured to detect an object passing through the first region from the work area, and wherein the detection device is configured to detect the object at a plurality of locations in the first region that are spaced apart in the vertical direction.

11. The shutter according to claim 1, wherein the one or more reinforcing ribs protrude from only the back surface side of the body part.

12. The shutter according to claim 1, wherein:

with a first fitting part being one of the two fitting parts of each of the coupling members, a second fitting part being another one of the two fitting parts, a first coupling member being one of two of the coupling members that are adjacent to each other in the guide direction, and a second coupling member being another one of the two adjacent coupling members, the first fitting part and the second fitting part have complementary shapes, the first fitting part of the first coupling member and the second fitting part of the second coupling member that are fitted to a corresponding rod-shaped member are disposed in such a manner as to be fitted to each other in the first direction, the at least one cover part of the first fitting part includes N cover parts, where N is a natural number, and the at least one cover part of the second fitting part includes N+1 cover parts.

13. The shutter according to claim 1, wherein the opening and closing body comprises restriction members provided so as not to move in the first direction relative to the rod-shaped members and configured to restrict the coupling members from moving in the first direction relative to the rod-shaped members, and the restriction members are attachable to the respective rod-shaped members in a direction orthogonal to the first direction.

14. A transport facility comprising:

a shutter according to claim 1;

an article placement portion which is provided in a placement region of the shutter and on which an article is placeable;

a work area in which work is performed on the article; and a transport area for transporting the article to the article placement portion, wherein the shutter covers the article placement portion from above and is configured to separate the work area and the transport area from an area in which the article placement portion is provided, the article placement portion includes a plurality of struts disposed in a vertical direction and a plurality of article receiving portions provided on respective upper portions of the plurality of struts, the transport facility further comprises an automated guided vehicle provided in the transport area and configured to travel on a floor as a transport device configured to transport the article, the automated guided vehicle is movable between the transport area and an area in which each of the plurality of article receiving portions is provided, and the automated guided vehicle includes a placement table on which the article is placeable and which is configured to be raised and lowered between an upper position and a lower position for the article receiving portion to receive the article.

* * * * *